US012585208B2

(12) United States Patent
Takahashi et al.

(10) Patent No.: US 12,585,208 B2
(45) Date of Patent: Mar. 24, 2026

(54) GLITTERING TONER, TONER-STORING UNIT, DEVELOPER, DEVELOPER-STORING UNIT,IMAGE FORMING APPARATUS, AND IMAGE FORMING METHOD

(71) Applicants: Tsukiko Takahashi, Shizuoka (JP); Kohsuke Satoh, Shizuoka (JP); Kazumi Suzuki, Shizuoka (JP); Daichi Hisakuni, Shizuoka (JP); Kazuoki Fuwa, Shizuoka (JP)

(72) Inventors: Tsukiko Takahashi, Shizuoka (JP); Kohsuke Satoh, Shizuoka (JP); Kazumi Suzuki, Shizuoka (JP); Daichi Hisakuni, Shizuoka (JP); Kazuoki Fuwa, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 581 days.

(21) Appl. No.: 18/079,050

(22) Filed: Dec. 12, 2022

(65) Prior Publication Data

US 2023/0185210 A1 Jun. 15, 2023

(30) Foreign Application Priority Data

Dec. 14, 2021 (JP) ................................ 2021-202427
Aug. 30, 2022 (JP) ................................ 2022-136677

(51) Int. Cl.
*G03G 9/09* (2006.01)
*G03G 9/087* (2006.01)

(52) U.S. Cl.
CPC ....... *G03G 9/0902* (2013.01); *G03G 9/08711* (2013.01); *G03G 9/08755* (2013.01); *G03G 9/08795* (2013.01); *G03G 9/0926* (2013.01)

(58) Field of Classification Search
CPC ............ G03G 9/0902; G03G 9/08711; G03G 9/08755; G03G 9/0926
See application file for complete search history.

(56) References Cited

U.S. PATENT DOCUMENTS 10,670,980 B2 * 6/2020 Ohnuma ............ G03G 9/08786
2004/0058260 A1 3/2004 Katoh et al.
(Continued)

FOREIGN PATENT DOCUMENTS

EP 1 750 177 A2 2/2007
JP 2002-226733 8/2002
(Continued)

OTHER PUBLICATIONS

U.S. Appl. No. 17/811,692, filed Jul. 11, 2022.
(Continued)

*Primary Examiner* — Peter L Vajda
*Assistant Examiner* — Jenna Kuipers
(74) *Attorney, Agent, or Firm* — XSENSUS LLP

(57) ABSTRACT

A glittering toner includes: a flat metallic pigment having a surface coated with a resin; a polyester-styrene acrylic composite resin; and a polyester resin. When a solubility parameter of the polyester-styrene acrylic composite resin is represented by SP1 $(cal/cm^3)^{1/2}$ and a solubility parameter of the polyester resin is represented by SP2 $(cal/cm^3)^{1/2}$, the SP1 and the SP2 satisfy a relational expression (1): [SP2−SP1>0.3] and the SP1 satisfies a relational expression (2): [10<SP1].

8 Claims, 3 Drawing Sheets

(56) References Cited

U.S. PATENT DOCUMENTS

| | | | |
|---|---|---|---|
| 2005/0088697 | A1 | 4/2005 | Yasutomi et al. |
| 2005/0254846 | A1 | 11/2005 | Yura et al. |
| 2006/0013604 | A1 | 1/2006 | Kadota et al. |
| 2007/0071511 | A1 | 3/2007 | Suzuki et al. |
| 2007/0212129 | A1 | 9/2007 | Takemoto et al. |
| 2008/0008505 | A1 | 1/2008 | Seto et al. |
| 2008/0063971 | A1 | 3/2008 | Watanabe et al. |
| 2008/0069598 | A1 | 3/2008 | Murakami et al. |
| 2008/0069608 | A1 | 3/2008 | Katoh et al. |
| 2008/0070149 | A1 | 3/2008 | Kato et al. |
| 2008/0159777 | A1 | 7/2008 | Fuwa et al. |
| 2008/0199234 | A1 | 8/2008 | Hagi et al. |
| 2008/0226356 | A1 | 9/2008 | Yasunaga et al. |
| 2008/0233506 | A1 | 9/2008 | Hagi et al. |
| 2008/0279591 | A1 | 11/2008 | Yasunaga et al. |
| 2009/0003898 | A1 | 1/2009 | Kayahara et al. |
| 2009/0162772 | A1 | 6/2009 | Fuwa et al. |
| 2009/0169270 | A1 | 7/2009 | Fuwa et al. |
| 2009/0325100 | A1 | 12/2009 | Watanabe et al. |
| 2010/0021209 | A1 | 1/2010 | Watanabe et al. |
| 2010/0055590 | A1 | 3/2010 | Honda et al. |
| 2011/0177447 | A1 | 7/2011 | Suzuki et al. |
| 2011/0250533 | A1 | 10/2011 | Kadota et al. |
| 2012/0202147 | A1 | 8/2012 | Suzuki et al. |
| 2012/0219321 | A1 | 8/2012 | Fukao et al. |
| 2012/0237267 | A1 | 9/2012 | Fukao et al. |
| 2012/0251938 | A1 | 10/2012 | Yamamoto et al. |
| 2012/0264048 | A1 | 10/2012 | Ishikawa et al. |
| 2012/0328976 | A1 | 12/2012 | Seki et al. |
| 2013/0157183 | A1 | 6/2013 | Santo et al. |
| 2013/0236826 | A1 | 9/2013 | Makabe et al. |
| 2014/0050504 | A1 | 2/2014 | Fukao et al. |
| 2014/0147779 | A1 | 5/2014 | Fuwa et al. |
| 2014/0147780 | A1 | 5/2014 | Nozaki et al. |
| 2014/0147784 | A1 | 5/2014 | Kadota et al. |
| 2014/0272690 | A1 | 9/2014 | Suzuki et al. |
| 2014/0356774 | A1 | 12/2014 | Miki et al. |
| 2015/0030819 | A1 | 1/2015 | Naito et al. |
| 2015/0037718 | A1 | 2/2015 | Morita et al. |
| 2015/0153671 | A1 | 6/2015 | Yamauchi et al. |
| 2015/0192872 | A1 | 7/2015 | Noguchi et al. |
| 2015/0248074 | A1 | 9/2015 | Suzuki et al. |
| 2015/0253685 | A1 | 9/2015 | Suzuki et al. |
| 2016/0033924 | A1 | 2/2016 | Fukao et al. |
| 2016/0195829 | A1 | 7/2016 | Takahashi et al. |
| 2017/0139337 | A1 | 5/2017 | Kaneko et al. |
| 2017/0227873 | A1 | 8/2017 | Sugawara et al. |
| 2017/0248896 | A1 | 8/2017 | Nakatake et al. |
| 2017/0269499 | A1* | 9/2017 | Ishihara ............... G03G 9/0926 |
| 2017/0348872 | A1 | 12/2017 | Suzuki et al. |
| 2019/0196362 | A1 | 6/2019 | Tanaka et al. |
| 2020/0033745 | A1 | 1/2020 | Sawada et al. |
| 2020/0089140 | A1 | 3/2020 | Masuda et al. |
| 2020/0298440 | A1 | 9/2020 | Aoto et al. |
| 2020/0333720 | A1 | 10/2020 | Sawada et al. |
| 2021/0018855 | A1 | 1/2021 | Sawada et al. |
| 2021/0116830 | A1 | 4/2021 | Takei et al. |
| 2021/0311416 | A1 | 10/2021 | Masuda et al. |
| 2021/0341851 | A1 | 11/2021 | Suzuki et al. |
| 2022/0066344 | A1 | 3/2022 | Sawada et al. |
| 2022/0326632 | A1 | 10/2022 | Makabe et al. |
| 2022/0342332 | A1 | 10/2022 | Sugiyama et al. |
| 2022/0357679 | A1* | 11/2022 | Danno ............... G03G 9/09371 |

FOREIGN PATENT DOCUMENTS

| | | |
|---|---|---|
| JP | 2013-057906 | 3/2013 |
| JP | 5617427 | 11/2014 |
| JP | 2015-132651 | 7/2015 |
| JP | 2017-062410 | 3/2017 |
| JP | 2017-090573 A | 5/2017 |
| JP | 6123685 | 5/2017 |
| JP | 2017-142401 | 8/2017 |

OTHER PUBLICATIONS

U.S. Appl. No. 17/814,644, filed Jul. 25, 2022.
Extended European Search Report issued Apr. 3, 2023 in European Patent Application No. 22212769.8, 6 pages.

* cited by examiner

GLITTERING TONER, TONER-STORING UNIT, DEVELOPER, DEVELOPER-STORING UNIT,IMAGE FORMING APPARATUS, AND IMAGE FORMING METHOD

CROSS-REFERENCE TO RELATED APPLICATION

The present application claims priority under 35 U.S.C. § 119 to Japanese Patent Application No. 2021-202427, filed Dec. 14, 2021 and Japanese Patent Application No. 2022-136677, filed Aug. 30, 2022. The contents of which are incorporated herein by reference in their entirety.

BACKGROUND OF THE INVENTION

1. Field of the Invention

The disclosures herein generally relate to a glittering toner, a toner-storing unit, a developer, a developer-storing unit, an image forming apparatus, and an image forming method.

2. Description of the Related Art

As electrophotographic color image forming apparatuses have been widely used, their applications have been diversified, and metallic images have been desired in addition to conventional color images. A glittering toner containing a glittering pigment in a binding resin is used for the purpose of forming an image having a glittering property like metal.

It is important for an image having metallic gloss to have strong light reflectivity when viewed from a certain angle. Therefore, it is necessary to blend a highly reflective pigment (glittering pigment) having scale-like flat surfaces into a toner for developing an electrostatic charge image (hereinafter referred to as a toner). As such a highly reflective pigment, a metal or a metal-coated pigment is suitable. In addition, in order to ensure reflection performance, it is necessary to arrange a pigment that has a plane surface having a certain area per particle in a toner fixed image in a planar manner.

For example, Japanese Unexamined Patent Application Publication No. 2002-226733 discloses an aluminum pigment in which a resin is allowed to adhere to the surface of flaky aluminum powder in order to obtain a metallic coating film excellent in metallic feeling and designability.

For example, Japanese Patent No. 5617427 discloses a toner having a ratio (A/B) of a reflectance A at a light-receiving angle of +30° to a reflectance B at a light-receiving angle of −30° and a weight average molecular weight in specific numerical ranges in order to realize an excellent glittering property.

In addition, for example, Japanese Unexamined Patent Application Publication No. 2017-062410 discloses toner particles, which include: a binder resin having a peak top molecular weight (Mp) or a ratio (Mw/Mp) of a weight average molecular weight (Mw) to the peak top molecular weight (Mp) in a specific numerical range; and a flat glittering pigment, in order to obtain a high image glittering property and minimize a phenomenon in which the toner scatters under high-temperature and high-humidity environments.

Moreover, Japanese Unexamined Patent Application Publication No. 2015-132651 discloses a toner that includes a polyester resin, a glittering pigment, and at least one of styrene-acrylic resin particles and acrylic resin particles for the purpose of minimizing the occurrence of fogging.

SUMMARY OF THE INVENTION

In one embodiment, a glittering toner includes: a flat metallic pigment having a surface coated with a resin; a polyester-styrene acrylic composite resin; and a polyester resin. When a solubility parameter of the polyester-styrene acrylic composite resin is represented by SP1 $(cal/cm^3)^{1/2}$ and a solubility parameter of the polyester resin is represented by SP2 $(cal/cm^3)^{1/2}$, the SP1 and the SP2 satisfy a relational expression (1) below and the SP1 satisfies a relational expression (2) below.

$$SP2-SP1>0.3 \quad (1)$$

$$10<SP1 \quad (2)$$

DESCRIPTION OF THE PREFERRED EMBODIMENTS

Figure 1:
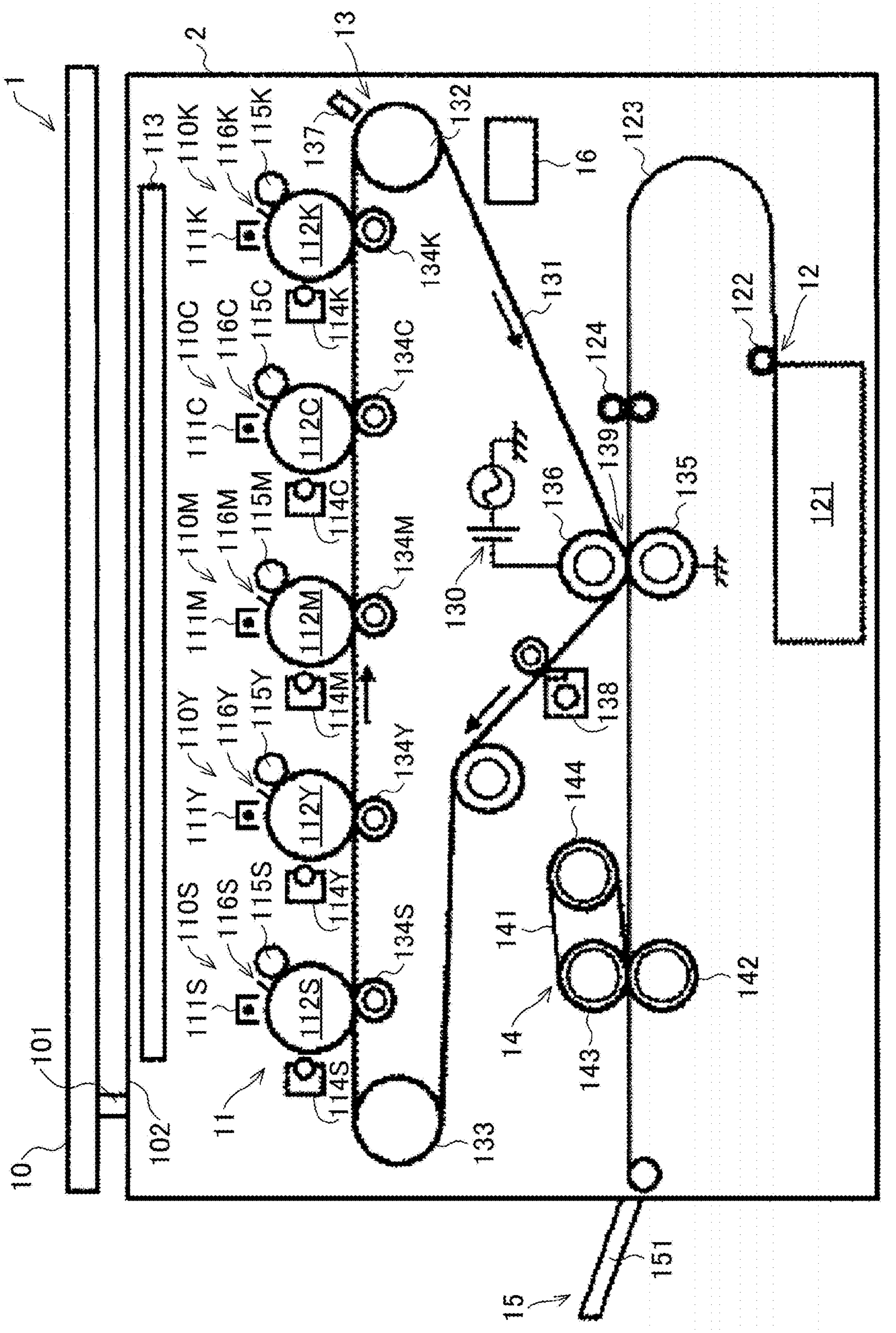
FIG. 1 is an overall configuration view of an image forming apparatus illustrating one embodiment of the present disclosure.

In the following, embodiments of the present invention will be described with reference to the accompanying drawings.

Conventionally, in order to obtain a glittering image, it has been considered that planes of a glittering pigment are arranged side by side on the image surface formed by a toner, and light must be reflected efficiently. However, since conventional toners are designed so that the average diameter of a toner is larger than the average thickness of the toner, a pigment contained in the toner is often present in a state that the pigment is arranged in a certain direction. In such a case, a plurality of flat pigments may overlap at narrow intervals.

In the case where a toner includes a metal or a metal-coated material as the glittering pigment, when the flat glittering pigments overlap with each other at narrow intervals, the electric resistance of the toner decreases and an electric conduction path is easily formed. In addition, since the relative permittivity of the toner becomes high, it becomes difficult to hold electric charges on the surface of the toner, and the chargeability of the toner may decrease.

Therefore, the conventional toners were insufficient from the viewpoints of forming an image with high definition and high quality while ensuring the glittering property of the image, minimizing a decrease in the electric resistance and an increase in the permittivity of the toner, and minimizing deterioration in the electric characteristics and the charging characteristics.

As a result of intensive studies, the present inventors were able to provide a glittering toner that minimizes a phenomenon in which the toner scatters from an image portion to a non-image portion when a toner image is transferred to a recording medium while a high image glittering property is obtained by appropriately setting a solubility parameter of a toner that contains a flat metallic pigment having a surface coated with a resin, a polyester resin as a toner matrix, and a polyester-styrene acrylic composite resin. In addition, the presence of the polyester-styrene acrylic composite resin can increase adhesion between the glittering pigment and the binding resin, and thus can minimize peeling of an image.

An object of the present disclosure is to provide a glittering toner having a high image glittering property and an excellent transferability.

According to the present disclosure, it is possible to obtain a glittering toner having a high image glittering property and an excellent transferability.

A glittering toner of the present disclosure and its production method will be described in detail hereinafter.

(Glittering Toner)

A glittering toner according to the present embodiment (hereinafter, may be simply referred to as “toner”) includes: a flat metallic pigment having a surface coated with a resin; a polyester-styrene acrylic composite resin; and a polyester resin.

In the toner according to the present embodiment, the polyester resin forms a matrix of the toner, and the polyester-styrene acrylic composite resin and the flat metallic pigment having the surface coated with the resin are dispersed in the matrix.

Figure 2:
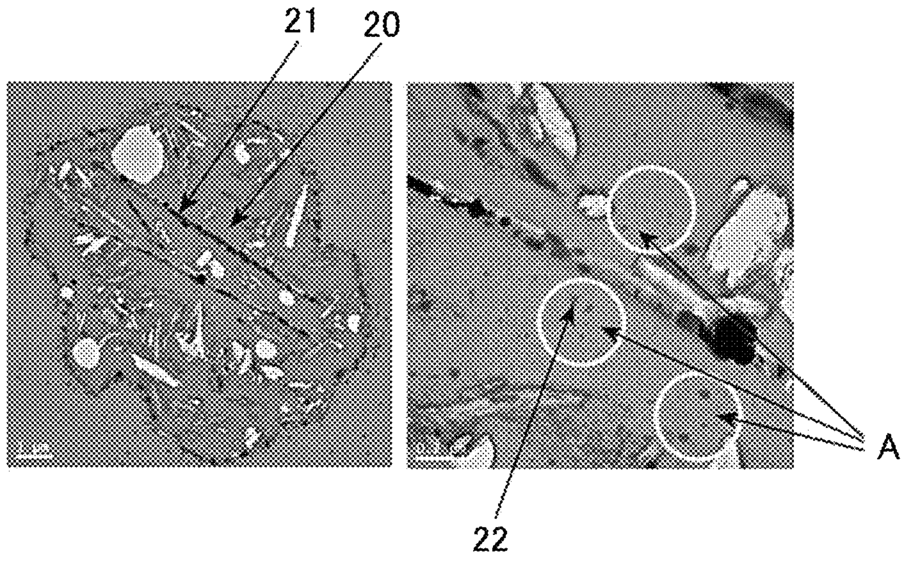
FIG. 2 is an example of the SEM image obtained by observing the cross section of the toner of Example 1.
Figure 3:
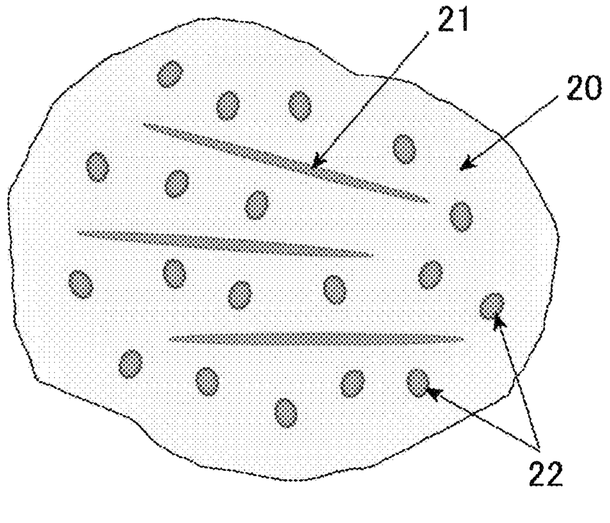
FIG. 3 illustrates an example of the dispersion state of each component in the toner of the present disclosure.

FIG. 2 is an example of the SEM image obtained by observing the cross section of the toner of Example 1. FIG. 3 is a view schematically presenting the dispersion state of each component in the toner according to the present embodiment. Reference numerals 20 to 22 in FIGS. 2 and 3 correspond to each other.

FIGS. 2 and 3 present a state in which a flat metallic pigment 21 and a polyester-styrene acrylic resin 22 are dispersed in a matrix 20 formed of a polyester resin in the toner.

The polyester-styrene acrylic composite resin is used to minimize excessive aggregation of a flat metallic pigment having a surface coated with a resin, and to arrange the flat metallic pigment such that the flat metallic pigment is dispersed in a toner matrix. The polyester-styrene acrylic composite resin has a difference in compatibility with the polyester resin that forms the toner matrix, and thus precipitates as fine particles in the toner matrix to exhibit an effect as a pigment dispersant.

In order to form a state in which a polyester-styrene acrylic composite resin (hereinafter also referred to as “composite resin”) and a flat metallic pigment having a surface coated with a resin (hereinafter also referred to as “resin-coated metallic pigment”) are dispersed in a matrix formed of a polyester resin, it is necessary to set solubility parameters (SP values) of the respective components to appropriate values.

In the glittering toner of the present disclosure, when a solubility parameter of the composite resin is represented by SP1 $(cal/cm^3)^{1/2}$ and a solubility parameter of the polyester resin is represented by SP2 $(cal/cm^3)^{1/2}$, the SP1 and the SP2 satisfy a relational expression (1) below and the SP1 satisfies a relational expression (2) below.

$$SP2-SP1>0.3 \qquad (1)$$

$$10<SP1 \qquad (2)$$

When $SP2-SP1>0.3$ is satisfied, the composite resin precipitates in the toner matrix.

When $SP2-SP1>0.3$ is satisfied, it is possible to solve the problem in which the value of the solubility parameter (SP1) of the composite resin becomes close to the value of the solubility parameter (SP2) of the polyester resin, and the composite resin and the polyester resin become compatible with each other, whereby the composite resin does not precipitate as fine particles and exhibits no effect as a pigment dispersant.

Furthermore, when the solubility parameter (SP1) of the composite resin is greater than 10, the resin-coated metallic pigment can be dispersed. When $10<SP1$ is satisfied, it is possible to solve the problem in which a difference between the value of the solubility parameter (SP1) of the composite resin and the value of the solubility parameter (SP2) of the polyester resin becomes large, whereby the composite resin forms a large domain in the toner matrix.

When a solubility parameter of the resin-coated metallic pigment is represented by SPpig, the solubility parameter (SP2) of the polyester resin and the solubility parameter (SPpig) of the resin-coated metallic pigment preferably satisfy a relational expression (3) below, and more preferably satisfy a relational expression (4) below.

$$SP2<SPpig<13 \qquad (3)$$

$$SP2<SPpig<12 \qquad (4)$$

The SP value represented by a resin-coated flat metallic pigment is the SP value of a resin that coats a surface of the flat metallic pigment. In the present disclosure, the SP value, which is represented by the resin that coats the surface of the flat metallic pigment, is referred to as the “SP value of a flat metallic pigment having a surface coated with a resin”.

As described above, the particles of the pigment dispersant and the resin-coated metallic pigment can be present in the matrix of the polyester resin when the solubility parameter (SP1) of the polyester-styrene acrylic composite resin and the solubility parameter (SPpig) of the resin-coated metallic pigment are appropriately separated and the solubility parameter (SP2) of the polyester resin is larger than the (SP1) but smaller than the (SPpig).

<Metallic Pigment>

The metallic pigment is preferably a metallic pigment that efficiently reflects light. Examples of the metallic pigment include metal powders such as aluminum, brass, bronze, nickel, stainless steel, zinc, copper, silver, gold, and platinum, and metal-deposited flaky glass powders. Among these, aluminum is preferable because of its high light reflectance and minimized reduction in reflectance caused by oxidation.

The metallic pigment may have a flat shape so as to have a light reflecting surface. This makes it possible to exhibit glittering property.

The surface of the metallic pigment is preferably subjected to a surface treatment in terms of dispersibility and stain resistance. The metallic pigment may be coated with, for example, various surface treatment agents, silane coupling agents, titanate coupling agents, fatty acids, silica particles, acrylic resins, and polyester resins. Among them, the metallic pigment is preferably coated with a resin from the viewpoint that the polyester-styrene acrylic composite resin exhibits an effect as a pigment dispersant. As described above, when the solubility parameters of the polyester resin, the polyester-styrene acrylic composite resin, and the metallic pigment are appropriately set, it is possible to obtain a structure in which the fine particles of the pigment dispersant and the metallic pigment are present in the matrix of the polyester resin. Therefore, a hydrophilic treatment using, for example, a silane coupling agent is unsuitable.

Furthermore, when the solubility parameter (SPpig) of the resin-coated metallic pigment is larger than the solubility parameter (SP2) of the polyester resin as the toner matrix and is smaller than 13, the metallic pigment can be included in the toner. When the solubility parameter (SPpig) of the resin-coated metallic pigment of smaller than 12 is preferable because the metallic pigment can be more appropriately included in the toner.

An average thickness of the glittering pigment is preferably 25 nm or more and 200 nm or less, and more preferably 80 nm or more and 150 nm or less. When the average thickness of the glittering pigment is 25 nm or more, the proportion of light passing through the glittering pigment increases, and therefore a disadvantageous problem for increasing the luminosity in highlights can be solved, which is suitable. In addition, from the viewpoint of minimizing a problem that the glittering pigment is easily deformed to cause disadvantageous orientation, the average thickness of the glittering pigment is preferably 0.4% or more of the volume average particle diameter of the glittering pigment, for example, preferably 30 nm or more.

On the other hand, when the average thickness of the glittering pigment is 200 nm or less, it is possible to solve such a problem that the orientation of the glittering pigment decreases, the volumetric ratio of the glittering pigment in the glittering pigment-containing layer necessary for ensuring the glittering property is increased, to thereby decrease the coating film properties, which is suitable.

An aspect ratio (volume average particle diameter/average thickness) of the metallic pigment is preferably 20 or more and 200 or less, and more preferably 40 or more and 200 or less. When the aspect ratio (volume average particle diameter/average thickness) is 20 or more, the pigment does not become too spherical and has excellent glittering property. When the aspect ratio is 40 or more, the amount of the flat pigment per mass increases, so that the pigment coverage rate during fixing is improved while the relative permittivity of the toner is maintained. When the aspect ratio is 200 or less, bending of the metallic pigment is minimized at the time of fixing, which improves the glittering property.

<Method of Coating Metallic Pigment with Resin>

A specific method of coating a metallic pigment with a resin is preferably a method described below. Specifically, a monomer and/or an oligomer and a polymerization initiator such as benzoyl peroxide, isobutyl peroxide, or azobisisobutyronitrile are added to a dispersing element in which a metallic pigment is dispersed in a hydrocarbon-based solvent or an alcohol-based solvent (preferably a hydrocarbon-based solvent), and the mixture is heated with stirring, to cause radical polymerization of the monomer and/or oligomer, thereby depositing the monomer and/or oligomer on the surface of the metallic pigment.

Examples of the monomer and/or oligomer include the following. Specific examples thereof include, but are not limited to, acrylic acid, methacrylic acid, methyl methacrylate, butyl acrylate, 2-ethylhexyl acrylate, lauryl acrylate, stearyl acrylate, cyclohexyl acrylate, 2-hydroxyethyl acrylate, 2-hydroxybutyl acrylate, 2-methoxyethyl acrylate, 2-diethylaminoethyl acrylate, butyl methacrylate, octyl methacrylate, 1,4-butanediol diacrylate, 1,6-hexanediol diacrylate, 1,9-nonanediol diacrylate, neopentyl glycol diacrylate, tripropylene glycol diacrylate, tetraethylene glycol diacrylate, trimethylolpropane triacrylate, trimethylolpropane trimethacrylate, tetramethylolmethane tetraacrylate, pentaerythritol triacrylate, trisacryloxyethyl phosphate, ditrimethylolpropane tetraacrylate, styrene, α-methylstyrene, vinyltoluene, divinylbenzene, acrylonitrile, methacrylonitrile, vinyl acetate, vinyl propionate, maleic acid, crotonic acid, itaconic acid, polybutadiene, linseed oil, soybean oil, epoxidized soybean oil, epoxidized polybutadiene, cyclohexene vinylmonoxide, divinylbenzene monoxide, mono(2-acryloyloxyethyl) acid phosphate, mono(2-methacryloyloxyethyl) acid phosphate, 2-acryloyloxyethyl acid phosphate, 2-methacryloyloxyethyl acid phosphate, (2-hydroxyethyl)methacrylate acid phosphate, 2-methacryloyloxyethyl acid phosphate, 2-acryloyloxyethyl acid phosphate, diphenyl methacryloyloxyethyl acid phosphate, diphenyl acryloyloxyethyl acid phosphate, dibutyl methacryloyloxyethyl acid phosphate, dibutyl acryloyloxyethyl acid phosphate, dioctyl methacryloyloxyethyl acid phosphate, dioctyl acryloyloxyethyl acid phosphate, 2-methacryloyloxypropyl acid phosphate, bis(2-chloroethyl) vinyl phosphonate, di-2-methacryloyloxyethyl acid phosphate, tri-2-methacryloyloxyethyl acid phosphate, di-2-acryloyloxyethyl acid phosphate, tri-2-acryloyloxyethyl acid phosphate, diallyldibutylphosphonosuccinate, acrylic-modified polyester (degree of polymerization: about 2 to 20), acrylic-modified polyether (degree of polymerization: about 2 to 20), acrylic-modified urethane (degree of polymerization: about 2 to 20), acrylic-modified epoxy (degree of polymerization: about 2 to 20), and acrylic-modified spiran (degree of polymerization: about 2 to 20).

These monomers and/or oligomers can be intentionally changed, to produce a sample having an adjusted SP value.

An example of a method of producing the glittering pigment is presented below.

First, an ethyl acetate solution of a methacrylate polymer is coated on the surface of a support formed of a polyester film, and the ethyl acetate solution is evaporated to form a release layer formed of a methacrylate polymer film. Next, aluminum is deposited on the surface of the release layer in vacuum to form an aluminum layer. The polyester film on which the aluminum layer is formed is put into ethyl acetate to dissolve the release layer, thereby obtaining pulverized aluminum flakes. The aluminum flakes are pulverized by, for example, a homogenizer, and the pulverized product is filtered and washed to obtain a glittering pigment.

The glittering pigment having a resin coating layer is prepared by forming a release layer on the surface of a polyester film in the same manner as described above, forming a resin layer on the surface of the release layer, and then forming an aluminum layer on the surface of the resin layer through vapor deposition in vacuum. Next, a resin layer is formed on the surface of the aluminum layer. Then, the polyester film on which the resin layer and the aluminum layer are formed is put into ethyl acetate to dissolve the release layer, thereby obtaining aluminum flakes having a pulverized resin coating layer. The aluminum flakes having the resin coating layer are pulverized by, for example, a homogenizer, and the pulverized product is filtered and washed to obtain a glittering pigment having the resin coating layer.

<Solubility Parameter>

The SP value (solubility parameter) will be described.

The SP value is referred to as a solubility parameter, and is a numerical value representing the degree of mutual solubility. The SP value is represented by a square root of an attractive force between molecules; i.e., a cohesive energy density (CED). The CED is the amount of energy required to evaporate 1 mL of a substance.

The SP value in the present disclosure can be calculated by the Fedors method using the following formula (I).

$$\text{SP value (solubility parameter)}=(\text{CED value})^{1/2}=(E/V)^{1/2} \qquad \text{formula (I)}$$

In the above formula (I), E is the molecular cohesive energy (cal/mol), and V is the molecular volume ($cm^3$/mol).

When the evaporation energy of the atomic group is Δei and the molar volume is Δvi, they are represented by the following formulas (II) and (III), respectively.

$$E=\Sigma\Delta ei \quad \text{Formula (II)}$$

$$V=\Sigma\Delta vi \quad \text{formula (III)}$$

There are various methods of calculating the SP value, but in the present disclosure, the commonly used Fedors method was used. The data described in "Basic Theory of Adhesion" (written by Minoru Imoto, published by Kobunshi Kankokai, Chapter 5) are used for the calculation method and various data of the evaporation energy Δei of each atomic group and the molar volume Δvi. With respect to —$CF_3$ groups and the like which are not illustrated, reference is made to R. F. Fedors, Polym. Eng. Sci. 14147 (1974). For example, when the flat metallic pigment having a surface coated with a resin, the polyester-styrene acrylic composite resin, and the polyester resin are each synthesized and mixed, the SP values thereof can be easily calculated as described above.

<Polyester Resin>

The polyester contains a component insoluble in THF (tetrahydrofuran) and a component soluble in THF.

The component insoluble in THF includes a component A and a component B, and the component soluble in THF includes a component C. The component A and the component B may be components constituting a copolymer of polyester or may be a component constituting a mixture of polyesters.

The glass transition temperature (Tg2nd) of the component A at the second temperature rise of DSC is from −45° C. to 5° C., preferably from −40° C. to −20° C. When the Tg2nd of the component A is −45° C. or higher, such a problem that the heat resistant storage stability of the toner decreases can be solved, which is suitable. When the Tg2nd of the component A is 5° C. or lower, such problems that the low temperature fixability of the toner and the glittering property of images are reduced and images are peeled can be solved, which is suitable.

The Tg2nd of the component B is from 45° C. to 70° C., and preferably from 50° C. to 60° C. When the Tg2nd of the component B is 45° C. or higher, such a problem that the heat resistant storage stability of the toner decreases can be solved, which is suitable. When the Tg2nd of the component B is 70° C. or less, such a problem that the gloss of an image is deteriorated can be solved, which is suitable.

The Tg2nd of the component C is from 40° C. to 65° C., preferably from 50° C. to 60° C. When the Tg2nd of the component C is 40° C. or higher, such a problem that the heat resistant storage stability of the toner decreases can be solved, which is suitable. When the Tg2nd of the component C is 65° C. or less, such problems that the low temperature fixability of the toner and the glittering property of image are reduced and images are peeled can be solved, which is suitable.

The component A and the component B are components derived from, for example, an amorphous polyester having a weight average molecular weight (Mw) of from 100,000 to 200,000, and the component C is a component derived from, for example, an amorphous polyester having a weight average molecular weight (Mw) of from 3,000 to 10,000.

The component A imparts plasticity to the toner. The component A decreases the Tg1st or melt viscosity of the toner according to the present embodiment and has low temperature fixability. Moreover, the component A has such a rubber property that the component A is deformed at low temperatures but does not flow because it has a branched structure in the molecular skeleton and the molecular chains form a three-dimensional network structure. If the content of the component A is too high, the Tg1st of the toner is too low and the heat resistant storage stability of the toner cannot be ensured. On the other hand, if the content of the component A is too low, the plasticity is insufficiently imparted to the toner and the low temperature fixability of the toner cannot be satisfied. In addition, there are concerns that the required elasticity is not imparted to the toner, the high temperature offset resistance of the toner decreases, a fixable area becomes narrow, and the image becomes too shiny.

In the present embodiment, when the toner has the Tg2nd equivalent to the Tg1st and includes the component B that imparts elasticity, elasticity can be imparted while the Tg1st of the toner is secured. As a result, it is possible to secure an offset region and to control the gloss of an image in an appropriate region. However, the cause is not certain, but when the components A, B, and C are contained at any composition ratio, the polyester is separated, resulting in poor dispersion of the glittering pigment. As a result, the glittering property of the image decreases. Therefore, adjusting the composition ratio of the components A, B and C to be appropriate can ensure the fixable area and the heat resistant storage stability of the toner without decreasing the glittering property of the image.

The glass transition temperature (Tg1st) of the toner at the first temperature rise of DSC (differential scanning calorimetry) according to the present embodiment is from 45° C. to 65° C., and preferably from 50° C. to 60° C. When the Tg1st of the toner is 45° C. or higher, such a problem that the heat resistant storage stability of the toner decreases can be solved, which is suitable. When the Tg1st of the toner is 65° C. or lower, such problems that the low temperature fixability of the toner and the glittering property of the image decrease and images are peeled can be solved, which is suitable. If there are multiple peaks such as a polyester-derived peak and a peak derived from a release agent described later in the DSC curve at the first temperature rise of the toner, the polyester-derived peak is used to determine the Tg1st of the toner.

The Tg1st of the toner according to the present embodiment can be adjusted by changing, for example, the composition ratio of an aliphatic diol-derived constituent unit and an aliphatic dicarboxylate-derived constituent unit of the component A, the glass transition temperature of the component B, the glass transition temperature of the component C, and the composition ratio of the component A, the component B, and the component C. The toner according to the present embodiment preferably satisfies the following formula, where the mass ratio of the component A is a, the mass ratio of the component B is b and the mass ratio of the component C is c, relative to the total mass of the component A, the component B, and the component C.

$$4(a+b)<c$$

This further improves the glittering property of images, and the fixable area and the heat resistant storage stability of the toner.

In addition, changing the composition ratio of the components A, B and C can change the molecular aggregation energy and molecular volume and can adjust the SP value.

<<Component A>>

The component A preferably contains a constituent unit derived from a polyhydric alcohol and a constituent unit derived from polycarboxylic acid, and more preferably contains a constituent unit derived from diol and a constituent unit derived from dicarboxylic acid. The polyhydric alcohol and the polycarboxylic acid may be used alone or in combination.

Examples of the diol in the component A include aliphatic diols having from 3 to 10 carbon atoms. Examples of the aliphatic diol having from 3 to 10 carbon atoms include 1,2-propylene glycol, 1,3-propylene glycol, 1,4-butanediol, 2-methyl-1,3-propanediol, 1,5-pentanediol, 3-methyl-1,5-pentanediol, 1,6-hexanediol, 1,8-octanediol, 1,10-decanediol, and 1,12-dodecanediol. The ratio of the aliphatic diol having from 3 to 10 carbon atoms to the polyhydric alcohol is preferably 50 mol % or more, and more preferably 80 mol % or more. In addition, the diol in the component A has an odd number of carbon atoms of from 3 to 9 in the main chain part of the polyester, preferably has an alkyl group in the side chain part of the polyester, and is more preferably a compound represented by Formula (1) below.

$$HO(CR^1R^2)_nOH \quad (1)$$

(In the formula, $R^1$ and $R^2$ are each independently a hydrogen atom or an alkyl group having from 1 to 3 carbon atoms, n is an odd number of from 3 to 9, and n $R^1$s and $R^2$s may be identical or different, respectively.)

Preferably, the component A further contains a constituent unit having a cross-linked structure. A constituent unit derived from a trihydric or higher aliphatic alcohol can be used as the constituent unit having the cross-linked structure, and a constituent unit derived from a trivalent or tetravalent aliphatic alcohol is preferable in terms of the gloss of images and image density. The number of carbon atoms in the trivalent or tetravalent aliphatic alcohol in the component A is preferably from 3 to 10.

Examples of the trihydric or higher aliphatic alcohol in the component A include glycerin, trimethylolethane, trimethylolpropane, pentaerythritol, sorbitol, and dipentaerythritol. As the constituent unit having the cross-linked structure, a constituent unit derived from trivalent or higher carboxylic acid or a constituent unit derived from a trivalent or higher epoxy compound may be used.

The ratio of the constituent unit having the cross-linked structure in all the constituent units of the component A is preferably from 0.5% by mass to 5% by mass, more preferably from 1% by mass to 3% by mass. The ratio of the trihydric or higher aliphatic alcohol to the constituent unit having the cross-linked structure is preferably from 50% by mass to 100% by mass, and more preferably from 90% by mass to 100% by mass.

Examples of the dicarboxylic acid in the component A include aliphatic dicarboxylic acid having from 4 to 12 carbon atoms. The ratio of the aliphatic dicarboxylic acid having from 4 to 12 carbon atoms to polycarboxylic acid is preferably 50 mol % or more. Examples of the aliphatic dicarboxylic acid having from 4 to 12 carbon atoms include succinic acid, glutaric acid, adipic acid, pimelic acid, suberic acid, azelaic acid, sebacic acid, and dodecanedioic acid.

The component A preferably has a urethane bond and/or a urea bond from the viewpoint of excellent adhesiveness to a recording medium such as paper. As a result, the urethane bond and/or the urea bond behave like a pseudo-crosslinking point, the rubber-like property of the component A is strengthened, and the heat resistant storage stability and the high temperature offset resistance of the toner are further improved.

The weight average molecular weight (Mw) of the component A is preferably from 100,000 to 200000. When the Mw of the component A is 100,000 or more, the heat resistant storage stability of the toner is further improved. When the Mw of the component A is 200,000 or less, the low temperature fixability of the toner and the adhesion between the glittering pigment and the polyester are further improved. The Mw can be measured by GPC (gel permeation chromatography).

<<Component B>>

The component B preferably contains a constituent unit derived from a polyhydric alcohol and a constituent unit derived from polycarboxylic acid. The component B is preferably a modified polyester containing a bond other than an ester bond. The polyhydric alcohol and the polycarboxylic acid may be used alone or in combination.

Examples of the diol as the polyhydric alcohol in the component B include: alkylene glycols (e.g., ethylene glycol, 1,2-propylene glycol, 1,3-propylene glycol, 1,4-butanediol, and 1,6-hexanediol); alkylene ether glycols (e.g., diethylene glycol, triethylene glycol, dipropylene glycol, polyethylene glycol, polypropylene glycol, and polytetramethylene ether glycol); alicyclic diols (e.g., 1,4-cyclohexanedimethanol and hydrogenated bisphenol A); bisphenols (e.g., bisphenol A, bisphenol F, and bisphenol S); alkylene oxide (e.g., ethylene oxide, propylene oxide, and butylene oxide) adducts of the alicyclic diols; and alkylene oxide (e.g., ethylene oxide, propylene oxide, and butylene oxide) adducts of the bisphenols.

Among them, alkylene glycols having 2 to 12 carbon atoms and alkylene oxide adducts of bisphenols (e.g., an ethylene oxide 2 mol adduct of bisphenol A, a propylene oxide 2 mol adduct of bisphenol A, and a propylene oxide 3 mol adduct of bisphenol A) are preferable.

Examples of the trivalent or higher polyol as the polyhydric alcohol in the component B include polyhydric aliphatic alcohols (e.g., glycerin, trimethylolethane, trimethylolpropane, pentaerythritol, and sorbitol); trivalent or higher polyphenols (e.g., phenol novolac and cresol novolac); and alkylene oxide adducts of trivalent or higher polyphenols.

Examples of the dicarboxylic acid as the polycarboxylic acid in the component B include alkylene dicarboxylic acids (e.g., succinic acid, adipic acid, and sebacic acid); alkenylene dicarboxylic acids (e.g., maleic acid and fumaric acid); and aromatic dicarboxylic acids (e.g., terephthalic acid, isophthalic acid, and naphthalene dicarboxylic acid). Among them, alkenylene dicarboxylic acids having from 4 to 20 carbon atoms and aromatic dicarboxylic acids having from 8 to 20 carbon atoms are preferable. Examples of trivalent or higher polycarboxylic acids include aromatic polycarboxylic acids having from 9 to 20 carbon atoms (e.g., trimellitic acid and pyromellitic acid). Instead of the polycarboxylic acid, an anhydride of polycarboxylic acid or a lower alkyl ester (e.g., methyl ester, ethyl ester, isopropyl estera) may be used. The component B preferably has a urethane bond and/or a urea bond from the viewpoint of excellent adhesiveness to a recording medium such as paper. As a result, the urethane bond and/or the urea bond behave like a pseudo-crosslinking point, the rubber-like property of the component B is strengthened, and the heat resistant storage stability and the high temperature offset resistance of the toner are further improved.

<<Component C>>

The component C preferably includes a constituent unit derived from a polyhydric alcohol and a constituent unit derived from polycarboxylic acid, and more preferably includes a constituent unit derived from diol and a constituent unit derived from dicarboxylic acid. The polyhydric alcohol and the polycarboxylic acid may be used alone or in combination.

The component C is preferably a linear polyester. The component C is preferably a non-modified polyester. The non-modified polyester is polyester that is not modified with, for example, an isocyanate compound.

Examples of the diol in the component C include: alkylene (2 to 3 carbon atoms) oxide (average number of moles added: 1 to 10) adducts of bisphenol A such as polyoxypropylene (2.2)-2,2-bis (4-hydroxyphenyl) propane and polyoxyethylene (2.2)-2,2-bis(4-hydroxyphenyl) propane; alkylene glycols such as ethylene glycol and propylene glycol; hydrogenated bisphenol A; and alkylene (2 to 3 carbon atoms) oxide (average number of moles added: 1 to 10) adducts of hydrogenated bisphenol A. Among them, alkylene glycol is preferable. The ratio of alkylene glycol to diol is preferably 40 mol % or more.

Examples of the dicarboxylic acid in the component C include adipic acid, phthalic acid, isophthalic acid, terephthalic acid, fumaric acid, maleic acid, and succinic acids substituted with an alkyl group having from 1 to 20 carbon atoms or an alkenyl group having from 2 to 20 carbon atoms, such as dodecenylsuccinic acid and octylsuccinic acid. Among them, terephthalic acid is preferable. The ratio of terephthalic acid to dicarboxylic acid is preferably 50 mol % or more. The component C may further include a constituent unit derived from trivalent or higher carboxylic acid and/or a constituent unit derived from trihydric or higher alcohol at a terminal thereof in order to adjust the acid number and the hydroxyl number.

Examples of the trivalent or higher carboxylic acid in the component C include trimellitic acid and pyromellitic acid. Examples of the trihydric or higher alcohol in the component C include glycerin, pentaerythritol, and trimethylolpropane.

The component C preferably further includes a constituent unit having a cross-linked structure. As the constituent unit having a cross-linked structure, a constituent unit derived from a trihydric or higher aliphatic alcohol can be used, and a constituent unit derived from a trihydric or tetrahydric aliphatic alcohol is preferable from the viewpoints of the gloss of images and image density. The number of carbon atoms of the trihydric or tetrahydric aliphatic alcohol in the component C is preferably from 3 to 10. Examples of the trihydric or higher aliphatic alcohol in the component C include glycerin, trimethylolethane, trimethylolpropane, pentaerythritol, sorbitol, and dipentaerythritol. As the constituent unit having a cross-linked structure, a constituent unit derived from trivalent or higher carboxylic acid, a constituent unit derived from trivalent or higher epoxy compound, or the like may be used.

The weight average molecular weight (Mw) of the component C is preferably from 3,000 to 10,000, and more preferably from 4,000 to 7,000. When the Mw of the component C is 3,000 or more, the heat resistant storage stability of the toner and the durability against stress such as stirring in a developing machine are further improved. When the Mw of the component C is 10,000 or less, the viscoelasticity of the toner at the time of melting becomes low, and the adhesion between the glittering pigment and the polyester is further improved.

The number average molecular weight (Mn) of the component C is preferably from 1,000 to 4000, and more preferably from 1,500 to 3,000.

The Mw/Mn of the component C is preferably from 1.0 to 4.0, and more preferably from 1.0 to 3.5. The Mw and Mn can be measured by GPC (gel permeation chromatography).

The content of a component having a molecular weight of 600 or less in the component C is preferably from 2 to 10% by mass. When the content of the component having a molecular weight of 600 or less in the component C is 2% by mass or more, the low temperature fixability of the toner is further improved. When the content of the component having a molecular weight of 600 or less in the component C is 10% by mass or less, the heat resistant storage stability of the toner and the durability against stress such as stirring in a developing machine are further improved. The component C can be purified by extracting, with methanol, the component having a molecular weight of 600 or less.

The acid number of the component C is preferably from 1 mg KOH/g to 50 mg KOH/g, and more preferably from 5 mg KOH/g to 30 mg KOH/g. When the acid number of the component C is 1 mg KOH/g or more, the low temperature fixability of the toner is further improved. When the acid number of the component C is 50 mg KOH/g or less, the charge-stability of the toner, in particular, the charge-stability against environmental changes is improved. The hydroxyl number of the component C is preferably 5 mg KOH/g or more.

The content of the component C in the toner is preferably from 80% by mass to 90% by mass. When the content of the component C in the toner is 80% by mass or more, the dispersibility of the glittering pigment in the toner is further improved, and thus the glittering property of the toner is further improved. When the content of the component C in the toner is 90% by mass or less, the high temperature offset resistance of the toner is further improved.

<Polyester-Styrene Acrylic Composite Resin>

The composite resin used as a pigment dispersant is an amorphous resin including a styrene-acrylic portion and a polyester portion. Here, the styrene-acrylic portion refers to a styrene-acrylic-based resin component having a constituent unit derived from a raw material monomer of the styrene-acrylic-based resin, and the polyester portion refers to a polyester-based resin component having a constituent unit derived from a raw material monomer of the polyester-based resin.

The composite resin is a resin in which a polyester-based resin component (polyester resin unit) and a styrene-acrylic-based resin component (styrene-acrylic-based resin unit) are partially chemically bonded.

In addition to the mixture of raw material monomers of the two polymerizable resins of the polyester-based resin unit and the styrene-acrylic-based resin unit, a resin obtained by further mixing, as one of the raw material monomers, a monomer (both-reactive monomer) capable of reacting with both of the raw material monomers of the two polymerizable resins is preferable.

The both-reactive monomer is preferably a monomer including, in a molecule thereof, at least one functional group selected from the group consisting of a hydroxyl group, a carboxyl group, an epoxy group, a primary amino group primary amino group, and a secondary amino group, and an ethylenically unsaturated bond. Moreover, use of such a both-reactive monomer can improve the dispersibility of the resin to be a dispersion phase. Specific examples of the both-reactive monomer include acrylic acid, fumaric acid, methacrylic acid, citraconic acid, and maleic acid. Among them, acrylic acid, methacrylic acid, and fumaric acid are preferable.

The amount of the both-reactive monomer to be used is preferably from 0.1 parts by mass to 10 parts by mass relative to 100 parts by mass of the raw material monomers of the polyester-based resin. In addition, adjusting the ratio with the polyester-based resin by this method makes it possible to synthesize composite resins (pigment dispersants) having different SP values.

In the present disclosure, when the above-described raw material monomer mixture and the both-reactive monomer are used to cause the two polymerization reactions to obtain a composite resin, the progress and completion of the polymerization reactions do not need to be simultaneous in terms of time, and the reaction temperature and time may be appropriately selected according to the respective reaction mechanisms to facilitate and complete the reactions.

For example, in the method of producing the composite resin in the present disclosure, preferably, a raw material monomer of the polyester-based resin, a raw material monomer of the addition-polymerization-based resin, a both-reactive monomer, a catalyst such as a polymerization initiator, and the like are mixed to obtain an addition-polymerization-based resin component having a functional group capable of a polycondensation reaction mainly through a radical polymerization reaction at 50 to 180° C., and then the reaction temperature is raised to 190° C. to 270° C. to form the polyester-based resin component mainly through a polycondensation reaction.

<Other Materials>

In addition to the polyester resin, the toner of the present disclosure may contain other resins and other components such as a colorant, a wax, a charge control agent, an external additive, a flowability improving agent, a cleanability improving agent, and a magnetic material, if necessary, within a range not impairing the effects of the present disclosure.

—Crystalline Resin—

As the other resins, a crystalline resin may be contained.

The crystalline resin preferably melts at a temperature around the fixing temperature. When such a crystalline resin is contained in the toner, the crystalline resin becomes compatible with a binder resin as the crystalline resin melts at the fixing temperature, thereby improving the sharp melt property of the toner and exhibiting an excellent effect on the low temperature fixability.

The molecular weight of the crystalline polyester resin is not particularly limited. Preferably, in GPC measurement using an o-dichlorobenzene-soluble portion of the crystalline polyester resin, the weight average molecular weight (Mw) is from 3,000 to 30,000, the number average molecular weight (Mn) is from 1,000 to 10,000, and the Mw/Mn is from 0 to 10. More preferably, the weight average molecular weight (Mw) is from 5,000 to 15,000, the number average molecular weight (Mn) is from 2,000 to 10,000, and the Mw/Mn is from 1.0 to 5.0. When the weight average molecular weight (Mw) is 3,000 or more and the number average molecular weight is 1,000 or more, such a problem that the heat resistant storage stability of the toner deteriorates can be solved, which is suitable. When the weight average molecular weight (Mw) is 30,000 or less and the number average molecular weight is 10,000 or less, the low temperature fixability can be sufficiently imparted to the toner, which is suitable. In addition, when the Mw/Mn is 5.0 or less, a sufficient sharp melt property can be imparted to the toner, which is suitable.

The acid number of the crystalline polyester resin is not particularly limited, but is preferably 5 mg KOH/g or more, and more preferably 10 mg KOH/g or more, in order to achieve desired low temperature fixability from the viewpoint of affinity between paper and a resin. On the other hand, in order to improve high temperature offset resistance, the acid number of the crystalline polyester resin is preferably 45 mg KOH/g or less.

The hydroxyl number of the crystalline polyester resin is not particularly limited. The hydroxyl number of the crystalline polyester resin is preferably from 0 mg KOH/g to 50 mg KOH/g, and more preferably from 5 mg KOH/g to 50 mg KOH/g, in order to achieve desired low temperature fixability and good charging characteristics.

The content of the crystalline polyester resin in the toner is not particularly limited, but is preferably from 3 parts by mass to 20 parts by mass, and more preferably from 5 parts by mass to 15 parts by mass, relative to 100 parts by mass of the toner. When the content of the crystalline polyester resin in the toner is 3 parts by mass or more, such a problem that the effect on the low temperature fixability is poor can be solved, which is suitable. When the content of the crystalline polyester resin in the toner is 20 parts by mass or less, problems such as a decrease in heat resistant storage stability and deterioration in mechanical durability and abrasion resistance of the toner can be solved, which is suitable.

—Wax—

The wax is not particularly limited and may be appropriately selected from conventional waxes in accordance with the intended purpose.

For the purpose of minimizing stacking of the glittering pigment or widening the interplanar spacing of the glittering pigment, a wax branched in the course of production for imparting a certain degree of polarity, a wax into which a polar group is introduced, or the like is preferable.

The melting point of the wax may be as high as the melting temperature of the resin used in the toner, or may be high as long as the melting point is equal to or lower than the temperature of an image on paper at the time of fixing.

Examples of the polar group to be introduced into the wax include polar groups such as a hydroxyl group, a carboxyl group, an amide group, and an amino group. Examples of the wax include oxidized and modified waxes obtained by oxidizing hydrocarbons by an air oxidation method, metal salts of, for example, potassium and sodium, polymers containing an acidic group (e.g., terpolymers of a maleic anhydride copolymer and an α-olefin), salts thereof, imidoesters thereof, quaternary amine salts thereof, and those obtained by alkoxylating hydrocarbons modified with a hydroxyl group.

Examples of the wax used in the present disclosure include carbonyl group-containing waxes, polyolefin waxes, and long-chain hydrocarbon waxes.

Examples of the esterified carbonyl group-containing wax include polyalkanoic acid esters, polyalkanol esters, polyalkanoic acid amides, polyalkylamides, and dialkyl ketones.

Examples of the polyalkanoic acid ester wax include carnauba wax, montan wax, trimethylolpropane tribehenate, pentaerythritol tetrabehenate, pentaerythritol diacetate dibehenate, glycerin tribehenate, and 1,18-octadecanediol distearate.

Examples of the polyalkanol ester include tristearyl trimellitate and distearyl maleate.

Examples of the polyalkanoic acid amide include dibehenylamide.

Examples of the polyalkylamide include trimellitic acid tristearylamide.

Examples of the dialkyl ketone include distearyl ketone.

Among these carbonyl group-containing waxes, polyalkanoic acid esters are preferable.

Examples of the polyolefin wax include polyethylene waxes and polypropylene waxes.

Examples of the long-chain hydrocarbon wax include paraffin waxes and Sasol waxes.

The melting point of the wax is not particularly limited and may be appropriately selected in accordance with the intended purpose, but is preferably from 50° C. to 100° C., and more preferably from 60° C. to 90° C.

When the melting point of the wax is 50° C. or higher, heat resistant storage stability can be favorably maintained. When the melting point of the wax is 100° C. or lower, cold offset does not occur during fixing at a low temperature.

The melting point of the wax can be measured using, for example, differential scanning calorimeters (TA 60WS and DSC-60 (manufactured by SHIMADZU CORPORATION)). First, the wax (5.0 mg) is placed in a sample container made of aluminum, and the sample container is placed on a holder unit and set in an electric oven. Next, in a nitrogen atmosphere, the temperature is increased from 0° C. to 150° C. at a temperature increase rate of 10° C./min, then decreased from 150° C. to 0° C. at a temperature decrease rate of 10° C./min, and then further increased to 150° C. at a temperature increase rate of 10° C./min, to measure a DSC curve. From the obtained DSC curve, the maximum peak temperature of the heat of fusion at the second temperature rise can be determined as the melting point using the analysis program in the DSC-60 system.

—Colorant—

The colorant that can be used in combination with the glittering pigment is not particularly limited and may be appropriately selected from conventional colorants in accordance with the intended purpose.

Examples of the coloring pigment for black include carbon blacks (C.I. Pigment Black 7) such as furnace black, lamp black, acetylene black, and channel black; metals such as copper, iron (C.I. Pigment Black 11), and titanium oxide; and organic pigments such as aniline black (C.I. Pigment Black 1).

Examples of the coloring pigment for magenta include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 13, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 39, C.I. Pigment Red 40, C.I. Pigment Red 41, C.I. Pigment Red 48, C.I. Pigment Red 48:1, C.I. Pigment Red 49, C.I. Pigment Red 50, C.I. Pigment Red 51, C.I. Pigment Red 52, C.I. Pigment Red 53, C.I. Pigment Red 53:1, C.I. Pigment Red 54, C.I. Pigment Red 55, C.I. Pigment Red 57, C.I. Pigment Red 57:1, C.I. Pigment Red 58, C.I. Pigment Red 60, C.I. Pigment Red 63, C.I. Pigment Red 64, C.I. Pigment Red 68, C.I. Pigment Red 81, C.I. Pigment Red 83, C.I. Pigment Red 87, C.I. Pigment Red 88, C.I. Pigment Red 89, C.I. Pigment Red 90, C.I. Pigment Red 112, C.I. Pigment Red 114, C.I. Pigment Red 122, C.I. Pigment Red 123, C.I. Pigment Red 150, C.I. Pigment Red 163, C.I. Pigment Red 177, C.I. Pigment Red 179, C.I. Pigment Red 184, C.I. Pigment Red 202, C.I. Pigment Red 206, C.I. Pigment Red 207, C.I. Pigment Red 209, C.I. Pigment Red 211, C.I. Pigment Red 269, C.I. Pigment Violet 19, C.I. Vat Red 1, C.I. Vat Red 2, C.I. Vat Red 10, C.I. Vat Red 13, C.I. Vat Red 15, C.I. Vat Red 23, C.I. Vat Red 29, and C.I. Vat Red 35.

Examples of the coloring pigment for cyan include C.I. Pigment Blue 2, C.I. Pigment Blue 3, C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, C.I. Pigment Blue 17, C.I. Pigment Blue 60, C.I. Vat Blue 6, C.I. Acid Blue 45, and copper phthalocyanine pigments having a phthalocyanine skeleton substituted with 1 to 5 phthalimidomethyl groups, Green 7, and Green 36.

Examples of the coloring pigment for yellow include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 15, C.I. Pigment Yellow 16, C.I. Pigment Yellow 17, C.I. Pigment Yellow 23, C.I. Pigment Yellow 55, C.I. Pigment Yellow 65, C.I. Pigment Yellow 73, C.I. Pigment Yellow 74, C.I. Pigment Yellow 83, C.I. Pigment Yellow 97, C.I. Pigment Yellow 110, C.I. Pigment Yellow 139, C.I. Pigment Yellow 151, C.I. Pigment Yellow 154, C.I. Pigment Yellow 155, C.I. Pigment Yellow 180, C.I. Pigment Yellow 185, C.I. Vat Yellow 1, C.I. Vat Yellow 3, C.I. Vat Yellow 20, and Orange 36.

The content of the colorant in the toner is preferably from 1% by mass to 15% by mass, and more preferably from 3% by mass to 10% by mass. When the content of the colorant in the toner is 1% by mass or more, it is possible to minimize a decrease in tinting strength of the toner. When the content of the colorant in the toner is 15% by mass or less, it is possible to minimize poor dispersion of the pigment in the toner, and to effectively minimize problems such as a decrease in tinting strength and a decrease in electrical characteristics of the toner.

The colorant may be used in the form of a master batch combined with a resin. Such a resin is not particularly limited. From the viewpoint of compatibility with the binder resin, it is preferable to use the binder resin or a resin having a structure similar to that of the binder resin.

The master batch may be produced by mixing or kneading the resin and the colorant under a high shearing force. At this time, in order to enhance the interaction between the colorant and the resin, an organic solvent is preferably added. A so-called flushing method is also suitable because a wet cake of the colorant can be used as it is, and there is no need to dry it. The flushing method is a method in which an aqueous paste containing a colorant and water is mixed or kneaded with a resin and an organic solvent, and the colorant is transferred to the resin side, to remove the water and the organic solvent. For mixing or kneading, for example, a high-shear dispersing apparatus such as a three-roll mill can be used.

—Charge Control Agent—

Further, in order to impart an appropriate charging ability to the toner, a charge control agent may be contained in the toner if necessary.

As the charge control agent, any conventional charge control agent can be used. Since the color tone may change when a colored material is used, the charge control agent is preferably a colorless or nearly white material. Examples thereof include triphenylmethane-based dyes, molybdic acid chelate pigments, rhodamine-based dyes, alkoxy-based amines, quaternary ammonium salts (including fluorine-modified quaternary ammonium salts), alkylamides, a simple substance of phosphorus or compounds thereof, a simple substance of tungsten or compounds thereof, fluorine-based active agents, metal salts of salicylic acid, and metal salts of salicylic acid derivatives. These may be used alone or in combination.

The content of the charge control agent is determined by the type of the binder resin and the toner production method including the dispersion method, and is not unambiguously limited. The content is preferably 0.01% by mass or more and 5% by mass or less, and more preferably 0.02% by mass or more and 2% by mass or less, relative to the binder resin.

When the addition amount of the charge control agent is 5% by mass or less, the effect of the charge control agent can be exhibited without excessively increasing the chargeability of the toner, the electrostatic attraction force with the developing roller can be minimized, and problems such as a decrease in the flowability of the developer and a decrease in image density can be effectively minimized. When the addition amount of the charge control agent is 0.01% by mass or more, the charge rising property and the charge amount are sufficient.

—External Additive—

Various external additives can be added to the toner for the purpose of, for example, modifying flowability, adjusting the amount of charge, and adjusting electrical characteristics.

The external additive is not particularly limited and may be appropriately selected from conventional external additives in accordance with the intended purpose. Examples thereof include silica fine particles, hydrophobized silica fine particles, fatty acid metal salts (e.g., zinc stearate and aluminum stearate), metal oxides (e.g., titania, alumina, tin oxide, and antimony oxide), hydrophobized products thereof, and fluoropolymers. Among them, hydrophobized silica fine particles, titania particles, and hydrophobized titania fine particles are suitable.

Specific examples of the hydrophobized silica fine particles include HDK H2000, HDK H2000/4, HDK H2050EP, HVK21, and HDKH1303 (all manufactured by Hoechst AG); and R972, R974, RX200, RY200, R202, R805, and R812 (all manufactured by Nippon Aerosil Co. Ltd.).

Examples of the titania fine particles include P-25 (manufactured by Nippon Aerosil Co. Ltd.); STT-30 and STT-65CS (all manufactured by Titan Kogyo, Ltd.); TAF-140 (manufactured by Fuji Titanium Industry Co., Ltd.); and MT-150W, MT-500B, MT-600B, and MT-150A (all manufactured by TAYCA CORPORATION).

Examples of the hydrophobized titanium oxide fine particles include T-805 (manufactured by Nippon Aerosil Co. Ltd.); STT-30A and STT-65S-S (all manufactured by Titan Kogyo, Ltd.); TAF-500T and TAF-1500T (all manufactured by Fuji Titanium Industry Co., Ltd.); MT-100S and MT-100T (all manufactured by TAYCA CORPORATION); and IT-S (manufactured by ISHIHARA SANGYO KAISHA, LTD.).

The hydrophobized silica fine particles, hydrophobized titania fine particles, and hydrophobized alumina fine particles can be obtained by treating hydrophilic fine particles with a silane coupling agent such as methyltrimethoxysilane, methyltriethoxysilane, or octyltrimethoxysilane.

Examples of a hydrophobizing agent include: silane coupling agents such as dialkyldihalogenated silane, trialkylhalogenated silane, alkyltrihalogenated silane, and hexaalkyldisilazane; silylating agents; silane coupling agents having a fluorinated alkyl group; organic titanate coupling agents; aluminum coupling agents; silicone oil; and silicone varnish.

The average particle diameter of the primary particles of the external additive is preferably from 1 nm to 100 nm, and more preferably from 3 nm to 70 nm.

When the average particle diameter of the primary particles of the external additive is 1 nm or more, it is possible to effectively minimize such problems that the external additive is buried in the toner and its function is not easily effectively exhibited. When the average particle diameter of the primary particles of the external additive is 100 nm or less, it is possible to effectively minimize such a problem that the surface of a photoconductor is unevenly damaged.

As the external additive, inorganic fine particles or hydrophobized inorganic fine particles can be used in combination. However, it is more preferable to contain: at least two kinds of hydrophobized inorganic fine particles having an average particle diameter of primary particles of 20 nm or less; and at least one kind of hydrophobized inorganic fine particles having an average particle diameter of primary particles of 30 nm or more. The specific surface area of the inorganic fine particles measured by the BET method is preferably from 20 $m^2/g$ to 500 $m^2/g$.

The amount of the external additive added is preferably from 0.1% by mass to 5% by mass, and more preferably from 0.3% by mass to 3% by mass, relative to the toner.

(Production Method of Toner)

Conventional methods and materials for producing the toner can be appropriately used as long as the above-described requirements defined in the present disclosure can be satisfied. Examples of a method of producing the toner of the present disclosure include a kneading and pulverizing method and a so-called chemical method in which toner particles are granulated in an aqueous medium. However, a dissolution suspension method in which a resin for a toner or a coloring material is dissolved or dispersed in an organic solvent to form oil droplets, or a suspension polymerization method using a radical polymerizable monomer is suitable as a production method of realizing the above-described requirements.

A more preferable production method is a method of producing a toner including a step of dispersing, in an aqueous medium, an organic liquid containing a glittering pigment and, if necessary, a substance exhibiting at least one state of a needle-like state and a plate-like state, to prepare an oil-in-water (O/W type) emulsion. When the oil droplets are formed in the aqueous medium, the glittering pigment and other needle-like or plate-like particles can freely move therein, and arranging the glittering pigment in the same direction can be minimized. Since the oil droplets become toner particles thereafter, the glittering pigment and other needle-like or plate-like substances are fixed as they are.

<Dissolution Suspension Method and Suspension Polymerization Method>

The dissolution suspension method is a method of producing toner base particles by dispersing or emulsifying, in an aqueous medium, an oil phase composition, which is obtained by dissolving or dispersing, in an organic solvent, a toner composition containing at least a binder resin or a resin precursor, a colorant, and a wax.

The organic solvent used for dissolving or dispersing the toner composition is preferably a volatile organic solvent having a boiling point of less than 100° C. from the viewpoint of facilitating subsequent removal of the solvent.

Examples of the organic solvent used for dissolving or dispersing the toner composition include: ester-based or ester-ether-based solvents such as ethyl acetate, butyl acetate, methoxybutyl acetate, butyl acetate, methoxybutyl acetate, methyl cellosolve acetate, and ethyl cellosolve acetate; ether-based solvents such as diethyl ether, tetrahydrofuran, dioxane, ethyl cellosolve, butyl cellosolve, and propylene glycol monomethyl ether; ketone-based solvents such as acetone, methyl ethyl ketone, methyl isobutyl ketone, di-n-butyl ketone, and cyclohexanone; alcohol-based solvents such as methanol, ethanol, n-propanol, isopropanol, n-butanol, isobutanol, t-butanol, 2-ethylhexyl alcohol, and benzyl alcohol; and mixed solvents of two or more thereof.

In the dissolution suspension method, when the oil phase composition is dispersed or emulsified in an aqueous medium, an emulsifier or a dispersant may be used if necessary.

As the emulsifier or the dispersant, conventional surfactants, water-soluble polymers, and the like can be used.

The surfactant is not particularly limited. Examples thereof include anionic surfactants (e.g., alkylbenzenesulfonic acid and phosphoric acid ester), cationic surfactants (e.g., quaternary ammonium salt type cationic surfactants and amine salt type cationic surfactants), amphoteric surfactants (e.g., carboxylic acid salt type amphoteric surfactants, sulfuric acid ester salt type amphoteric surfactants, sulfonic acid salt type amphoteric surfactants, and phosphoric acid ester salt type amphoteric surfactants), and nonionic surfactants (e.g., AO addition type nonionic surfactants and polyhydric alcohol type nonionic surfactants). The surfactant may be used alone or in combination.

Examples of the water-soluble polymer include cellulose-based compounds (e.g., methyl cellulose, ethyl cellulose, hydroxyethyl cellulose, ethylhydroxyethyl cellulose, carboxymethyl cellulose, hydroxypropyl cellulose, and saponified products thereof), gelatin, starch, dextrin, gum arabic, chitin, chitosan, polyvinyl alcohol, polyvinylpyrrolidone, polyethylene glycol, polyethyleneimine, polyacrylamide, acrylic acid (salt)-containing polymers (e.g., sodium polyacrylate, potassium polyacrylate, ammonium polyacrylate, partially neutralized polyacrylic acid with sodium hydroxide, and sodium acrylate-acrylate copolymers), (partially) neutralized styrene-maleic anhydride copolymers with sodium hydroxide, and water-soluble polyurethanes (e.g., reaction products of polyethylene glycol, polycaprolactone diol, or the like with polyisocyanate). Moreover, as an auxiliary agent for emulsification or dispersion, for example, the above-mentioned organic solvent and the plasticizer can be used in combination.

In the dissolution suspension method, the toner is preferably obtained by dispersing or emulsifying an oil phase composition containing at least a binder resin, a binder resin precursor (reactive group-containing prepolymer) having a functional group reactive with an active hydrogen group, a colorant, and a wax in an aqueous medium containing fine resin particles, and reacting an active hydrogen group-containing compound contained in the oil phase composition and/or the aqueous medium with the reactive group-containing prepolymer.

The fine resin particles can be formed by a conventional polymerization method, but are preferably obtained as an aqueous dispersion liquid of fine resin particles.

Examples of a method of preparing an aqueous dispersion liquid of resin fine particles include the following methods (a) to (h).

(a) A method of directly preparing an aqueous dispersion liquid of resin fine particles by a polymerization reaction of any one of a suspension polymerization method, an emulsion polymerization method, a seed polymerization method, and a dispersion polymerization method using a vinyl monomer as a starting material.

(b) A method of preparing an aqueous dispersion liquid of resin fine particles by dispersing a precursor (monomer, oligomer or the like) of a polyaddition or condensation resin such as a polyester resin, a polyurethane resin or an epoxy resin, or a solvent solution thereof in an aqueous medium in the presence of an appropriate dispersant, and then heating or adding a curing agent to cure the resin.

(c) A method of preparing an aqueous dispersion liquid of resin particles by dissolving an appropriate emulsifier in a precursor (monomer, oligomer, or the like) of a polyaddition or condensation resin such as a polyester resin, a polyurethane resin, or an epoxy resin, or a solvent solution thereof (which is preferably liquid and may be liquefied by heating), and then adding water to perform phase inversion emulsification.

(d) A method of preparing an aqueous dispersion liquid of the resin fine particles by pulverizing and classifying a resin synthesized in advance by a polymerization reaction (for example, addition polymerization, ring-opening polymerization, polyaddition, addition condensation, or condensation polymerization) using a mechanical rotation type or jet type pulverizer to obtain resin fine particles, and dispersing the resin fine particles in water in the presence of an appropriate dispersant.

(e) A method of preparing an aqueous dispersion liquid of fine resin particles by spraying, in a mist form, a resin solution, which is prepared by dissolving, in a solvent, a resin synthesized in advance by a polymerization reaction (for example, addition polymerization, ring-opening polymerization, polyaddition, addition condensation, or condensation polymerization), to form fine resin particles; and then dispersing the fine resin particles in water in the presence of an appropriate dispersant.

(f) A method of preparing an aqueous dispersion liquid of resin fine particles by adding a poor solvent to a resin solution, which is prepared by dissolving, in a solvent, a resin synthesized in advance by a polymerization reaction (for example, addition polymerization, ring-opening polymerization, polyaddition, addition condensation, or condensation polymerization), or cooling a resin solution prepared by dissolving the resin in a solvent in advance under heating, to precipitate resin fine particles; removing the solvent to form resin fine particles; and dispersing the resin fine particles in water in the presence of a suitable dispersant.

(g) A method of preparing an aqueous dispersion liquid of resin fine particles by dispersing, in an aqueous medium, a resin solution, which is prepared by dissolving, in a solvent, a resin synthesized in advance by a polymerization reaction (for example, addition polymerization, ring-opening polymerization, polyaddition, addition condensation, or condensation polymerization) in the presence of an appropriate dispersant; and then removing the solvent by, for example, heating or pressure reduction.

(h) A method of preparing an aqueous dispersion liquid of resin fine particles by dissolving an appropriate emulsifier in a resin solution, which is prepared by dissolving, in a solvent, a resin synthesized in advance by a polymerization reaction (for example, addition polymerization, ring-opening polymerization, polyaddition, addition condensation, or condensation polymerization); and then adding water to perform phase inversion emulsification.

The volume average particle diameter of the resin fine particles is preferably 10 nm or more and 300 nm or less, and more preferably 30 nm or more and 120 nm or less. When the volume average particle diameter of the resin particles is 10 nm or more and 300 nm or less, it is possible to effectively minimize such a problem that the particle size distribution of the toner is deteriorated.

When the solid content concentration of the oil phase is 80% or less, problems such as difficulty in dissolution or dispersion and difficulty in handling due to an increased viscosity can be solved, which is suitable. When the solid content concentration of the oil phase is 40% or more, such a problem that the productivity of the toner is reduced can be solved, which is suitable.

The toner composition other than the colorant or the binder resin such as wax, and a master batch thereof may be separately dissolved or dispersed in an organic solvent and then may be mixed with the binder resin solution or the dispersion liquid.

As the aqueous medium, water may be used alone or in combination with a solvent miscible with water. Examples of the solvent miscible with water include alcohols (e.g., methanol, isopropanol, and ethylene glycol), dimethylformamide, tetrahydrofuran, cellosolves (e.g., methyl cellosolve), and lower ketones (e.g., acetone and methyl ethyl ketone).

The method of dispersing or emulsifying in the aqueous medium is not particularly limited, and known equipment such as low-speed shearing type equipment, high-speed shearing type equipment, friction type equipment, high-pressure jet type equipment, and ultrasonic type equipment can be applied. Among them, the high-speed shearing type equipment is preferable from the viewpoint of reducing the particle diameter of particles. When a high-speed shearing disperser is used, the number of revolutions is not particularly limited, but is usually from 1,000 rpm to 30,000 rpm, and preferably from 5,000 rpm to 20,000 rpm. The temperature during dispersion is usually from 0° C. to 150° C. (under pressure), and preferably from 20° C. to 80° C.

The method of removing the organic solvent from the obtained emulsified dispersing element is not particularly limited, and a conventional method can be used. For example, a method can be employed in which a temperature is gradually raised while an entire system is stirred under normal pressure or reduced pressure to completely evaporate and remove the organic solvent in droplets.

As a method of washing and drying the base particles of the toner dispersed in the aqueous medium, a conventional technique is used. That is, after solid-liquid separation is performed using a centrifugal separator, a filter press, or the like, the obtained toner cake is re-dispersed in ion-exchanged water at from room temperature to about 40° C. If necessary, the pH is adjusted with an acid or an alkali, and then the solid-liquid separation is performed again. This step is repeated several times to remove impurities, surfactants, and the like, followed by drying with, for example, an airstream dryer, a circulation dryer, a reduced-pressure dryer, or a vibration fluidized dryer, to obtain toner powder. At this time, fine particle components of the toner may be removed by, for example, centrifugal separation, or, if necessary, a desired particle size distribution can be obtained by using a conventional classifier after drying.

A suspension polymerization method can be achieved if a radical polymerizable monomer and a polymerization initiator instead of the organic solvent are used, to prepare an oil phase, emulsification is performed in the same manner to prepare oil droplets, and then a polymerization reaction is performed by heat or the like. The radical polymerizable monomer is preferably styrene, an acrylic acid ester, or a methacrylic acid ester-based monomer. As the polymerization initiator, an azo-based initiator and a peroxide-based initiator is selected. In the case of the suspension polymerization method, a step of removing the organic solvent is not necessary.

When the flat pigment is covered with, for example, a resin, the viscoelasticity of the toner surface may be increased.

A reactive functional group is preferentially arranged on the surface of the toner to generate a polymer and a cross-linking reaction. For example, at the time of toner production, different substances, which cause a reaction at the interface between the oil droplets in the aqueous medium and the aqueous medium, are allowed to exist. A reactive prepolymer is put in an oil droplet side, and a substance reacting with the prepolymer is put in a water system side.

In order to maintain high viscoelasticity of the toner surface, it is also effective to arrange solid fine particles on the toner surface. For example, organically modified inorganic fine particles that are easily oriented at the oil-water interface may be contained in the oil droplets. Examples of the organically modified inorganic fine particles include organically modified bentonite, organically modified montmorillonite, and organic solvent-dispersed colloidal silica.

Inorganic fine particles such as hydrophobic silica fine powder may be further added to and mixed with the toner base particles produced as described above, in order to enhance the flowability, storage stability, developability, and transferability of the toner.

In order to mix an additive, a powder mixer is generally used, but the mixer is preferably equipped with, for example, a jacket so that the internal temperature can be controlled. Note that, in order to change the load on the additive, the additive may be added during the course or in a gradual manner. In this case, for example, the number of revolutions, rolling speed, time, and temperature of the mixer may be changed. It is also possible to apply a strong load first and then a relatively weak load, or vice versa. Examples of the mixing equipment that can be used include a V-type mixer, a rocking mixer, a Loedige mixer, a Nauta mixer, and a Henschel mixer. Next, the mixture is passed through a sieve of 250 mesh or more to remove coarse particles and aggregated particles. Then, a toner is obtained.

(Developer)

The developer of the present disclosure contains at least the toner and, if necessary, other components such as a carrier, which are appropriately selected.

Therefore, the developer is excellent in, for example, transferability and chargeability and can stably form a high-quality image. The developer may be a one-component developer or a two-component developer. When the toner is used in a two-component developer, the toner may be mixed with a carrier. The amount of the carrier in the two-component developer is not particularly limited and may be appropriately selected in accordance with the intended purpose, but is preferably from 90% by mass to 98% by mass, and more preferably from 93% by mass to 97% by mass.

(Carrier)

The carrier is not particularly limited and may be appropriately selected in accordance with the intended purpose, but preferably includes a core material and a resin layer covering the core material.

—Core Material—

The core material is not particularly limited as long as it is a particle having magnetism. Preferable examples thereof include ferrite, magnetite, iron, and nickel. In consideration of its adaptability to the environment, which has progressed remarkably in recent years, it is suitable to use, for example, manganese ferrite, manganese-magnesium ferrite, manganese-strontium ferrite, manganese-magnesium-strontium ferrite, or lithium-based ferrite as ferrite, instead of conventional copper-zinc-based ferrite.

(Toner-Storing Unit)

The toner-storing unit in the present disclosure includes: a unit having a function of storing a toner; and a toner stored in the unit. Here, examples of the toner-storing unit include a toner storage container, a developing device, and a process cartridge.

The toner storage container refers to a container that stores a toner.

The developing device is a device having a unit that stores a toner and is configured to develop the toner.

The process cartridge refers to a cartridge, which includes at least an electrostatic latent image bearer (also referred to as an image bearer) and a developing unit that are integrated, stores a toner, and is detachably mountable to an image forming apparatus. The process cartridge may further include at least one selected from a charging unit, an exposure unit, and a cleaning unit.

When the toner-storing unit of the present disclosure is attached to an image forming apparatus to form an image, it is possible to form a high-definition and high-quality image while the brightness of the image is ensured.

A method of forming an image using the toner of the present disclosure will be described below.

FIG. 1 is an overall configuration view of an image forming apparatus according to an embodiment of the present disclosure.

An image forming apparatus 1 illustrated in FIG. 1 is a color image forming apparatus configured to form a color image by a tandem image forming unit (hereinafter referred to as an image formation unit), and includes an image reading unit 10, an image formation unit 11, a sheet feeding unit 12, a transfer unit 13, a fixing unit 14, a paper ejection unit 15, and a control unit 16.

(Image Reading Unit 10)

The image reading unit 10 is configured to read an image of a document and to generate image information. The image reading unit 10 includes a contact glass 101 and a reading sensor 102. In the image reading unit 10, a document is irradiated with light, the reflected light thereof is received by a sensor such as a CCD (charge coupled device) or a CIS (contact image sensor), and electrical color separation signals of RGB colors that are three primary colors of light are read.

(Image Formation Unit 11)

The image formation unit 11 includes five image formation units 110S, 110Y, 110M, 110C, and 110K that are configured to form/output toner images of four colors of yellow (Y), magenta (M), cyan (C), and black (K), and a special color (S) such as a colorless and transparent (clear) color or a white color.

The five image formation units 110S, 110Y, 110M, 110C, and 110K use S, Y, M, C, and K toners of different colors as image forming materials, but otherwise have the same configuration and are replaced at the end of their lives. Each of the image formation units 110S, 110Y, 110M, 110C, and 110K is configured to be detachably mountable to an apparatus main body 2, and constitutes a so-called process cartridge. Hereinafter, the common configuration will be described by presenting the image formation unit 110K for forming a K toner image as an example.

The image formation unit 110K includes, for example, a charging device 111K, a photoconductor 112K as a K-color toner image bearer configured to bear a K-color toner image on the surface, a developing device 114K, a discharging device 115K, a photoconductor cleaning device 116K. These devices are held by a common holding body, and can be simultaneously replaced by being integrally attached to and detached from the apparatus main body 2.

The photoconductor 112K has a drum shape with an outer diameter of 60 mm in which an organic photosensitive layer is formed on a surface of a substrate, and is rotationally driven counterclockwise by a driving unit. The charging device 111K is configured to apply a charging bias to charging wires serving as charging electrodes of a charger (charging device) to cause discharge between the charging wires and the outer peripheral surface of the photoconductor 112K, thereby uniformly charging the surface of the photoconductor 112K. In the present embodiment, the surface of the photoconductor 112K is charged to the same negative polarity as the charging polarity of the toner. As the charging bias, a bias obtained by superimposing an AC voltage on a DC voltage is employed. Instead of the charger, a system using a charging roller provided in contact with or close to the photoconductor 112K may be used.

The uniformly charged surface of the photoconductor 112K is optically scanned with a laser light emitted from an exposure device 113, which will be described later, to form an electrostatic latent image for K. In the whole region of the uniformly charged surface of the photoconductor 112K, the potential of the portion irradiated with the laser light is attenuated, and the potential of the laser-irradiated portion becomes smaller than the potential of another portion (background portion). The electrostatic latent image for K is developed by a developing device 114K using a K toner that will be described later, to form a K toner image. Then, the toner image is primarily transferred onto an intermediate transfer belt 131 that will be described later.

The developing device 114K includes a container in which a two-component developer containing a K toner and a carrier is stored, and is configured to carry the developer on the surface of a developing sleeve by the magnetic force of a magnet roller inside the developing sleeve provided in the container. A developing bias, which has the same polarity as the toner, is larger than the electrostatic latent image on the photoconductor 112K, and is smaller than the charging potential of the photoconductor 112K, is applied to the developing sleeve. Between the developing sleeve and the electrostatic latent image on the photoconductor 112K, a developing potential acts from the developing sleeve toward the electrostatic latent image. Further, a non-developing potential, which moves the toner on the developing sleeve toward the sleeve surface, acts between the developing sleeve and the background portion on the photoconductor 112K. By the action of the developing potential and the non-developing potential, the K toner on the developing sleeve is selectively attached to the electrostatic latent image on the photoconductor 112K to be developed, thereby forming a K-color toner image on the photoconductor 112K.

The discharging device 115K is configured to discharge the surface of the photoconductor 112K after the toner image is primarily transferred to the intermediate transfer belt 131. The photoconductor cleaning device 116K includes a cleaning blade and a cleaning brush, and is configured to remove, for example, transfer residual toner remaining on the surface of the photoconductor 112K that has been discharged by the discharging device 115K.

In FIG. 1, the image formation unit 110S includes, for example, a charging device 111S, a photoconductor 112S as a special-color toner image bearer configured to bear a special-color toner image on the surface, a developing device 114S, a discharging device 115S, and a photoconductor cleaning device 116S. The same applies to the other image formation units 110C, 110M, and 110Y. Therefore, also in the image formation units 110C, 110M, 110Y, and 110S, the S, Y, M, and C toner images are formed on the photoconductors 112S, 112Y, 112M, and 112C in the same manner as in the image formation unit 110K.

Above the image formation units 110S, 110Y, 110M, 110C, and 110K, a latent-image writing means or an exposure device 113 as an exposure means is disposed. The exposure device 113 is configured to optically scan the photoconductors 112S, 112Y, 112M, 112C, and 112K with laser light emitted from a laser diode based on image information transmitted from the image reading unit 10 or an external device such as a personal computer.

The exposure device 113 is configured to irradiate the photoconductors 112S, 112Y, 112M, 112C, and 112K with laser light emitted from a light source through a plurality of optical lenses or mirrors while polarizing the laser light in a main scanning direction by a polygon mirror rotationally driven by a polygon motor. Instead of the laser light, LED light emitted from a plurality of LEDs may be used to perform optical writing and irradiation.

(Sheet Feeding Unit 12)

The sheet feeding unit 12 is configured to supply a sheet, which is an example of paper, to the transfer unit 13, and includes a sheet storage unit 121, a sheet feeding pickup roller 122, a sheet feeding belt 123, and a registration roller 124. The sheet feeding pickup roller 122 is provided to rotate in order to move the paper accommodated in the sheet storage unit 121 toward the sheet feeding belt 123. The sheet feeding pickup roller 122 provided in this manner is configured to pick up the uppermost sheet of the stored sheets one by one, and to place it on the sheet feeding belt 123. The sheet feeding belt 123 is configured to convey the sheet picked up by the sheet feeding pickup roller 122 to the transfer unit 13. The registration roller 124 is configured to feed the sheet at a timing when a portion of the intermediate transfer belt 131 on which the toner image is formed reaches a secondary transfer nip 139 as a transfer nip of the transfer unit 13.

(Transfer Unit 13)

The transfer unit 13 is disposed below the image formation units 110S, 110Y, 110M, 110C, and 110K. The transfer unit 13 includes a driving roller 132, a driven roller 133, an intermediate transfer belt 131, primary transfer rollers 134S, 134Y, 134M, 134C, and 134K, a secondary transfer roller 135, a secondary transfer counter roller 136, a toner adhesion amount sensor 137, and a belt cleaning device 138.

The intermediate transfer belt 131 functions as an endless intermediate transfer member, and is stretched by the driving roller 132, the driven roller 133, the secondary transfer counter roller 136, and the primary transfer rollers 134S, 134Y, 134M, 134C, and 134K, which are disposed inside the loop. The term "disposed" means "arranged" or "positioned", and the term "stretched" means "stretched under tension".

The intermediate transfer belt 131 endlessly moves and runs in the same direction by the driving roller 132 that is rotationally driven in the clockwise direction by a driving unit in the figure, and moves while being in contact with the photoconductors 112S, 112Y, 112M, 112C, and 112K.

The intermediate transfer belt 131 has an average thickness of 20 to 200 [μm], and preferably has an average thickness of about 60 [μm]. In addition, carbon-dispersed polyimide resins having a volume resistivity of from $1\times10^{6}$ to $1\times10^{12}$ [Ω·cm], and preferably about $1\times10^{9}$ [Ω·cm] (measured by Hiresta UP MCP HT45 manufactured by Mitsubishi Chemical Corporation under a condition of application voltage of 100 V) are desirable.

The toner adhesion amount sensor 137 is disposed in the vicinity of the intermediate transfer belt 131 wound around the driving roller 132. The toner adhesion amount sensor 137 functions as a toner amount detection unit configured to detect the amount of the toner image transferred onto the intermediate transfer belt 131. The toner adhesion amount sensor 137 is formed of a light-reflective photosensor. The toner adhesion amount sensor 137 is configured to measure a toner adhesion amount by detecting an amount of light reflected from a toner image (including a special color toner) attached and formed on the intermediate transfer belt 131. Note that, the toner adhesion amount sensor 137 may also be used as, for example, a toner density sensor as a toner density detection means for detecting and measuring toner density, which has been conventionally generally used, due to the above-described function. In this case, since disposing a new toner amount detecting means can be avoided, it is possible to reduce the number of parts and contribute to cost reduction. Instead of the position facing the intermediate transfer belt 131, the toner adhesion amount sensor 137 may be disposed at a position where the toner image on the photoconductor 112 is detected.

The primary transfer rollers 134S, 134Y, 134M, 134C, and 134K are disposed to face the photoconductors 112S, 112Y, 112M, 112C, and 112K, respectively, with the intermediate transfer belt 131 interposed therebetween, and are driven to rotate so as to move the intermediate transfer belt 131. As a result, a primary transfer nip is formed in which the front surface of the intermediate transfer belt 131 and the photoconductors 112S, 112Y, 112M, 112C, and 112K abut on each other (this means that the front surface of the intermediate transfer belt 131 and the photoconductors 112S, 112Y, 112M, 112C, and 112K are in contact with each other). A primary transfer bias is applied to each of the primary transfer rollers 134S, 134Y, 134M, 134C, and 134K by a primary transfer bias power supply. As a result, primary transfer biases are formed between the S, Y, M, C, and K toner images on the photoconductors 112S, 112Y, 112M, 112C, and 112K and the primary transfer rollers 134S, 134Y, 134M, 134C, and 134K. Then, the toner images of the respective colors are sequentially transferred onto the intermediate transfer belt 131.

The S toner image formed on the surface of the photoconductor 112S for S enters the primary transfer nip for S with the rotation of the photoconductor 112S. Then, the toner image is primarily transferred from the photoconductor 112S onto the intermediate transfer belt 131 by the action of a transfer bias and a nip pressure. After that, the intermediate transfer belt 131 to which the S toner image has been primarily transferred sequentially passes through the primary transfer nips for Y, M, C, and K. Then, the Y, M, C, and K toner images on the photoconductors 112Y, 112M, 112C, and 112K are sequentially superimposed on the S toner image and are primarily transferred. Through the primary transfer caused by superimposing the toner images, a superimposed toner image, which includes a color toner image and a special color toner image including, for example, a clear toner, is formed on the intermediate transfer belt 131. That is, the toner images respectively born on the surfaces of the color toner image bearer and the special color toner image bearer are transferred to the intermediate transfer belt 131 in a superimposed manner.

The primary transfer rollers 134S, 134Y, 134M, 134C, and 134K are formed of an elastic roller that includes a metal cored bar and a conductive sponge layer fixed on this surface, and has an outer diameter of 16 [mm] and a cored bar diameter of 10 [mm]. In addition, a resistance value R of the sponge layer is calculated from a current I flowing when a voltage of 1,000 [V] is applied to the cored bars of the primary transfer rollers 134S, 134Y, 134M, 134C, and 134K in a state where a grounded metallic roller having an outer diameter of 30 [mm] is pressed against the sponge layer with a force of 10 [N]. Specifically, the resistance value R of the sponge layer, which is calculated based on Ohm's law (R=V/I) from a current I flowing when a voltage of 1,000 [V] is applied to the cored bar, is about $3\times10^7$ [Ω]. A primary transfer bias, which is output from the primary transfer bias power supply under constant current control, is applied to the primary transfer rollers 134S, 134Y, 134M, 134C, and 134K. Instead of the primary transfer rollers 134S, 134Y, 134M, 134C, and 134K, a transfer charger, a transfer brush, or the like may be employed.

The secondary transfer roller 135 is configured to nip the intermediate transfer belt 131 and a sheet between the secondary transfer roller 135 and the secondary transfer counter roller 136, and is rotationally driven by a driving unit. The secondary transfer roller 135 is in contact with the front surface of the intermediate transfer belt 131 to form the secondary transfer nip 139 as a transfer nip, and functions as a nip forming member and a transfer member configured to transfer a toner image on the intermediate transfer belt to a recording medium nipped by the secondary transfer nip. The secondary transfer counter roller 136 functions as a nip forming member and a counter member. While the secondary transfer roller 135 is grounded, a secondary transfer bias is applied to the secondary transfer counter roller 136 by a secondary transfer bias power supply 130.

The secondary transfer bias power supply 130 includes a DC power supply and an AC power supply, and can output a secondary transfer bias obtained by superimposing an AC voltage on a DC voltage. An output terminal of the secondary transfer bias power supply 130 is connected to a cored bar of the secondary transfer counter roller 136. The potential of the cored bar of the secondary transfer counter roller 136 has substantially the same value as the output voltage value from the secondary transfer bias power supply 130.

If the secondary transfer bias is applied to the secondary transfer counter roller 136, a secondary transfer bias, which electrostatically moves the toner having a negative polarity from the secondary transfer counter roller 136 side toward the secondary transfer roller 135 side, is formed between the secondary transfer counter roller 136 and the secondary transfer roller 135. Thus, the toner having the negative polarity on the intermediate transfer belt 131 can be moved from the secondary transfer counter roller 136 side to the secondary transfer roller 135 side.

In the secondary transfer bias power supply 130, a component having a negative polarity as a DC component is used similarly with the toner, and the time-averaged potential of the superimposed bias is set to the same negative polarity as that of the toner. Instead of grounding of the secondary transfer roller 135 while the superimposed bias is applied to the secondary transfer counter roller 136, the cored bar of the secondary transfer counter roller 136 may be grounded while the superimposed bias is applied to the secondary transfer roller 135. In this case, the polarities of the DC voltage and the DC component are made different.

In the case of using paper having large surface irregularities such as embossed paper, the toner is relatively moved from the intermediate transfer belt 131 side to the paper side and is transferred onto the paper while being reciprocated by application of the superimposed bias described above. As a result, it is possible to improve the transferability to the concave portion of the sheet, thereby improving the transfer rate and minimizing an abnormal image such as a void. On the other hand, in the case of using paper having small unevenness such as a normal transfer sheet, since a density pattern resulting from the uneven pattern does not appear, sufficient transferability can be obtained by application of a secondary transfer bias only by a direct current component.

The secondary transfer counter roller 136 is formed by laminating a resistance layer on a cored bar made of stainless steel, aluminum, or the like. The secondary transfer counter roller 136 has the following characteristics. That is, the outer diameter is about 24 [mm]. The cored bar has a diameter of about 16 [mm]. The resistance layer is made of a material obtained by dispersing conductive particles such as carbon or metal complexes in, for example, polycarbonate, fluorine-based rubber, or silicon-based rubber, or a semi-conductive rubber made of, for example, a rubber such as NBR or EPDM, an NBR/ECO copolymer rubber, or polyurethane. The volume resistance thereof is from $10^6$ to $10^{12}$ [Ω], and preferably from $10^7$ to $10^9$ [Ω]. Regarding the rubber hardness (ASKER-C), a foamed-type material having a rubber hardness of from 20 degrees to 50 degrees or a rubber-type material having a rubber hardness of from 30 degrees to 60 degrees may be used. However, since the secondary transfer counter roller 136 is in contact with the secondary transfer roller 135 via the intermediate transfer belt 131, a sponge-type material that does not generate non-contact portion even with a small contact pressure is desirable.

On the intermediate transfer belt 131 after the secondary transfer, which has passed through the secondary transfer nip, transfer residual toner that has not been transferred to the paper remains. The residual toner is removed and cleaned from the surface of the intermediate transfer belt 131 by a belt cleaning device 138 provided with a cleaning blade, which abuts on the surface of the intermediate transfer belt 131.

(Fixing Unit 14)

The fixing unit 14 employs a belt fixing system, and is configured to press a pressure roller 142 against a fixing belt 141 that is an endless belt. The fixing belt 141 is wound around a fixing roller 143 and a heating roller 144, and at least one of the rollers is provided with a heat source/heating unit (e.g., a heater, a lamp, or an electromagnetic induction heating device). The fixing belt 141 forms a fixing nip between the fixing belt 141 and the pressure roller 142 in a state of being nipped and pressed between the fixing roller 143 and the pressure roller 142.

The paper fed to the fixing unit 14 is nipped at the fixing nip so that the surface that bears an unfixed toner image is brought into close contact with the fixing belt 141. Then, since the toner in the toner image is softened through heating or pressurization, the toner image is fixed, and the paper is ejected to the outside of the machine. When an image is also formed on a surface of the paper opposite to the surface on which the toner image has been transferred, the paper is conveyed to a paper reversing mechanism after the toner image is fixed, and the paper is reversed by the paper reversing mechanism. Thereafter, a toner image is also formed on the opposite side in the same manner as in the image forming step described above.

The paper on which the toner is fixed by the fixing unit 14 is ejected from the image forming apparatus main body 2 to the outside of the apparatus via a paper ejection roller constituting the paper ejection unit 15, and is stored in a sheet storage unit 151 such as a paper ejection tray.

EXAMPLES

Hereinafter, Examples of the present disclosure will be described, but the present disclosure is not limited to the following Examples. Here, the "part (s)" represents "part (s)

by mass" unless otherwise specified. The "%" represents "% by mass" unless otherwise specified.

(Production of Resin-Coated Metallic Pigment)

The resin-coated metallic pigments 1 to 4 were obtained in the following manners.

—Production of Resin-Coated Metallic Pigment 1—

A three-neck flask was charged with mineral spirit (300 ml). Then, an aluminum pigment ((product name: "ALUMINUM PASTE CS460") (metal content: 50%, average particle diameter: 16 μm) manufactured by Toyo Aluminium K.K.) (200.0 g) as a metallic pigment and carboxylic acid with double bond (product name: "DIACID 1550", manufactured by Harima Chemicals, Inc) (20.0 g) obtained through thermal polymerization of acrylic acid and soy bean oil fatty acid were added thereto, followed by heating and stirring. Then, the mixture was cooled to normal temperature and was filtered, to perform a defatting step. As a result, the defatted metallic pigment was obtained.

Next, mineral spirit (400 ml) as a solvent, the defatted metallic pigment (200.0 g), the carboxylic acid (20.0 g), and ethylamine (20.0 g) were charged into a kneader, and were stirred at 60° C. for an hour, to obtain a slurry containing the metallic pigment.

Subsequently, the obtained slurry containing the metallic pigment (640 g) was charged into a three-neck flask to which mineral spirit (1000 ml) had been added, and acrylic acid (1.0 g) was further added thereto, followed by stirring. Next, a solution, which was obtained by dissolving trimethylolpropane trimethacrylate (30.0 g) and azobis(isobutyronitrile) (10.0 g) in mineral spirit (150 ml), was added thereto, followed by heating (80° C.) and stirring (6 hours). Then, the mixture was cooled to normal temperature, and was filtered, to obtain [resin-coated metallic pigment 1] having a surface on which a protection layer formed of the resin was formed.

—Production of Resin-Coated Metallic Pigment 2—

The [resin-coated metallic pigment 2] was obtained in the same manner as in the "Production of resin-coated metallic pigment 1" except that trimethylolpropane trimethacrylate was changed to trimethylolpropane triacrylate.

—Production of Resin-Coated Metallic Pigment 3—

The [resin-coated metallic pigment 3] was obtained in the same manner as in the "Production of resin-coated metallic pigment 1" except that trimethylolpropane trimethacrylate was changed to tetramethylolmethane tetraacrylate.

—Production of Resin-Coated Metallic Pigment—

The [resin-coated metallic pigment 4] was obtained in the same manner as in the "Production of resin-coated metallic pigment 1" except that trimethylolpropane trimethacrylate was changed to tetraethylene glycol diacrylate.

In Examples and Comparative Examples, the [resin-coated metallic pigment 1] to the [resin-coated metallic pigment 4], which are the surface-treated aluminum obtained in the above manner, were used. The physical characteristics of the [resin-coated metallic pigment 1] to the [resin-coated metallic pigment 4] are presented in Table 1.

TABLE 1

| Resin-coated metallic pigment No. | Sppig [$(cal/cm^3)^{1/2}$] |
|---|---|
| Resin-coated metallic pigment 1 | 13.1 |
| Resin-coated metallic pigment 2 | 12.9 |
| Resin-coated metallic pigment 3 | 12.1 |
| Resin-coated metallic pigment 4 | 11.9 |

(Production of Pigment Dispersant)

The pigment dispersants 1 to 4 as polyester-styrene acrylic composite resins were obtained in the following manner.

—Production of Pigment Dispersant 1—

A 5 L four-neck flask equipped with a nitrogen-introducing tube, a dehydrating tube, a stirrer, and a thermocouple was charged with 2,3-butanediol (7.2 g), 1,2-propanediol (4.08 g), terephthalic acid (20.59 g), and tin(II) 2-ethylhexanoate (0.18 g). Nitrogen gas was introduced into the container, and the mixture was maintained in an inert atmosphere and was heated. Then, the mixture was maintained at 180° C. for an hour, heated from 180° C. to 230° C. at a heating rate of 10° C./hr, polycondensed at 230° C. for 10 hours, and allowed to react at 230° C. and 8.0 kPa for an hour. After the mixture was cooled to 160° C., butyl acrylate (2.0 g), styrene (8.50 g), 2-ethylhexyl acrylate (1.48 g), and dibutyl peroxide (0.5 g) were added dropwise for an hour using a dropping funnel. After the dropwise addition, while an addition polymerization reaction was aged for an hour while the mixture was maintained at 160° C. After the mixture was heated to 210° C., trimellitic anhydride (4.61 g) was added thereto, and the mixture was allowed to react at 210° C. for 2 hours. The reaction was performed until a desired softening point was reached at 210° C. and 10 kPa, to obtain [pigment dispersant 1].

—Production of Pigment Dispersant 2—

A 5 L four-neck flask equipped with a nitrogen-introducing tube, a dehydrating tube, a stirrer, and a thermocouple was charged with 2,3-butanediol (7.2 g), 1,2-propanediol (6.08 g), terephthalic acid (18.59 g), and tin(II) 2-ethylhexanoate (0.18 g). Nitrogen gas was introduced into the container, and the mixture was maintained in an inert atmosphere and was heated. Then, the mixture was maintained at 180° C. for an hour, heated from 180° C. to 230° C. at a heating rate of 10° C./hr, polycondensed at 230° C. for 10 hours, and allowed to react at 230° C. and 8.0 kPa for an hour. After the mixture was cooled to 160° C., butyl acrylate (2.0 g), styrene (8.50 g), 2-ethylhexyl acrylate (1.48 g), and dibutyl peroxide (0.5 g) were added dropwise for an hour using a dropping funnel. After the dropwise addition, while an addition polymerization reaction was aged for an hour while the mixture was maintained at 160° C. After the mixture was heated to 210° C., trimellitic anhydride (4.61 g) was added thereto, and the mixture was allowed to react at 210° C. for 2 hours. The reaction was performed until a desired softening point was reached at 210° C. and 10 kPa, to obtain [pigment dispersant 2].

—Production of Pigment Dispersant 3—

A 5 L four-neck flask equipped with a nitrogen-introducing tube, a dehydrating tube, a stirrer, and a thermocouple was charged with 2,3-butanediol (7.2 g), 1,2-propanediol (8.08 g), terephthalic acid (16.59 g), and tin(II) 2-ethylhexanoate (0.18 g). Nitrogen gas was introduced into the container, and the mixture was maintained in an inert atmosphere and was heated. Then, the mixture was maintained at 180° C. for an hour, heated from 180° C. to 230° C. at a heating rate of 10° C./hr, polycondensed at 230° C. for 10 hours, and allowed to react at 230° C. and 8.0 kPa for an hour. After the mixture was cooled to 160° C., lauryl octyl acrylate (2.0 g), styrene (8.50 g), 2-ethylhexyl acrylate (1.48 g), and dibutyl peroxide (0.5 g) were added dropwise for an hour using a dropping funnel. After the dropwise addition, while an addition polymerization reaction was aged for an hour while the mixture was maintained at 160° C. After the mixture was heated to 210° C., trimellitic anhydride (4.61 g) was added thereto, and the mixture was allowed to react at 210° C. for 2 hours. The reaction was performed until a desired softening point was reached at 210° C. and 10 kPa, to obtain [pigment dispersant 3].

—Production of Pigment Dispersant 4—

A 5 L four-neck flask equipped with a nitrogen-introducing tube, a dehydrating tube, a stirrer, and a thermocouple was charged with 2,3-butanediol (7.2 g), 1,2-propanediol (6.08 g), terephthalic acid (18.59 g), and tin(II) 2-ethylhexanoate (0.18 g). Nitrogen gas was introduced into the container, and the mixture was maintained in an inert atmosphere and was heated. Then, the mixture was maintained at 180° C. for an hour, heated from 180° C. to 230° C. at a heating rate of 10° C./hr, polycondensed at 230° C. for 10 hours, and allowed to react at 230° C. and 8.0 kPa for an hour. After the mixture was cooled to 160° C., lauryl acrylate (2.0 g), styrene (8.50 g), 2-ethylhexyl acrylate (1.48 g), and dibutyl peroxide (0.5 g) were added dropwise for an hour using a dropping funnel. After the dropwise addition, while an addition polymerization reaction was aged for an hour while the mixture was maintained at 160° C. After the mixture was heated to 210° C., trimellitic anhydride (4.61 g) was added thereto, and the mixture was allowed to react at 210° C. for 2 hours. The reaction was performed until a desired softening point was reached at 210° C. and 10 kPa, to obtain [pigment dispersant 4].

In Examples and Comparative Examples, the [pigment dispersant 1] to the [pigment dispersant 4] obtained above manner were used. The physical characteristics of the [pigment dispersant 1] to the [pigment dispersant 4] are presented in Table 2.

TABLE 2

| Pigment dispersant No. | SP1 [(cal/cm$^3$)$^{1/2}$] |
|---|---|
| Pigment dispersant 1 | 11.0 |
| Pigment dispersant 2 | 10.8 |
| Pigment dispersant 3 | 10.1 |
| Pigment dispersant 4 | 9.9 |

<Preparation of Aqueous Phase>

A reaction container equipped with a stirring rod and a thermometer was charged with water (683 parts), a sodium salt of sulfate of an ethylene oxide adduct of methacrylic acid, ELEMINOL RS-30 (manufactured by Sanyo Chemical Industries, Ltd.) (16 parts), styrene (83 parts), methacrylic acid (83 parts), n-butyl acrylate (110 parts), and ammonium persulfate (1 part). Then, the mixture was stirred at 400 rpm for 15 minutes. Then, the mixture was heated to 75° C., and was allowed to react for 5 hours. Then, a 1% by mass ammonium persulfate aqueous solution (30 parts) was added thereto, and the mixture was aged at 75° C. for 5 hours, to obtain a vinyl-based resin dispersion liquid. When a laser diffraction/scattering particle size distribution analyzer LA-920 (manufactured by HORIBA, Ltd.) was used to measure a volume average particle diameter of the vinyl-based resin dispersion liquid, the volume average particle diameter was 14 nm. The vinyl-based resin had an acid number of 45 mg KOH/g, a weight average molecular weight of 300,000, and a glass transition point of 60° C.

Water (455 parts), the vinyl-based resin dispersion liquid (7 parts), a 48.5% by mass aqueous solution of sodium dodecyldiphenyl ether disulfonate, ELEMINOL MON-7 (manufactured by Sanyo Chemical Industries, Ltd.) (17 parts), and ethyl acetate (41 parts) were mixed and stirred, to obtain [aqueous phase] (520 parts in total).

<Synthesis of Wax Dispersant 1>

To a reaction tank equipped with a stirring rod and a thermometer, xylene (480 parts) and paraffin wax HNP-9 (manufactured by NIPPON SEIRO CO., LTD.) (100 parts) were added, and were heated until the materials were dissolved. Then, nitrogen purged was performed, and the mixture was heated to 170° C. A mixed solution of styrene (740 parts), acrylonitrile (100 parts), butyl acrylate (60 parts), di-t-butylperoxyhexahydroterephthalate (36 parts), and xylene (100 parts) was added dropwise for 3 hours, and was maintained at 170° C. for 30 minutes. Moreover, the mixture was defatted to obtain [wax dispersant 1].

<Preparation of Wax Dispersion Liquid W1>

After paraffin wax HNP-9 (manufactured by NIPPON SEIRO CO., LTD.) (150 parts), the wax dispersant 1 (15 parts), and ethyl acetate (335 parts) were added to a container equipped with a stirring rod and a thermometer, the mixture was heated to 80° C. under stirring, and was maintained at 80° C. for 5 hours. The mixture was cooled to 30° C. for an hour, and was then dispersed using a bead mill ULTRAVISCO MILL (manufactured by Aimex Co. Ltd) under three passes at a liquid feed rate of 1 kg/h and a disk peripheral speed of 6 m/s with 80% by volume of zirconia beads having a diameter of 0.5 mm being loaded, to obtain [wax dispersion liquid W1]. The particle diameter of the particles in the obtained wax dispersion liquid W1, which was measured using LA-920 (manufactured by HORIBA, Ltd.), was 350 nm. When the wax dispersion liquid W1 was diluted with a large excess of ethyl acetate, was dried, and was observed with an electron microscope, it had a flat plate shape (solid content concentration of the wax: 30%, total solid content concentration: 33%).

<Synthesis of Crystalline Polyester Resin R1>

A reaction tank equipped with a cooling tube, a stirrer, and a nitrogen-introducing tube was charged with sebacic acid (202 parts), adipic acid (15 parts), 1,6-hexanediol (177 parts), and a condensation catalyst tetrabutoxytitanate (0.5 parts). Then, under a nitrogen gas stream, the mixture was allowed to react at 180° C. for 8 hours while generated water was removed. Next, the mixture was gradually heated to 220° C., and was allowed to react for 4 hours while generated water and 1,6-hexanediol were removed under a nitrogen gas stream. Then, the mixture was allowed to react under reduced pressures of from 5 mm Hg to 20 mm Hg until the weight average molecular weight reached about 12,000, to obtain [crystalline polyester resin R1]. The [crystalline polyester resin R1] had a weight average molecular weight of 12,000 and a melting point of 60° C.

<Preparation of Crystalline Polyester Resin Dispersion Liquid C1>

After a container equipped with a stirring rod and a thermometer was charged with the [crystalline polyester resin R1] (150 parts) and ethyl acetate (335 parts), the mixture was heated to 80° C. under stirring, and was maintained at 80° C. for 5 hours, to dissolve the crystalline polyester resin R1. Next, the mixture was immersed in a methanol bath cooled with dry ice, and was rapidly cooled, to obtain a crystalline polyester resin dispersion liquid. The crystals obtained through cooling at −20° C. for an hour were acicular crystals having a size of from 1 μm to 15 μm when observed with an optical microscope. The crystalline polyester resin dispersion liquid was then dispersed using a bead mill ULTRAVISCO MILL (manufactured by Aimex Co. Ltd) under three passes at a liquid feed rate of 1 kg/h and a disk peripheral speed of 6 m/s with 80% by volume of zirconia beads having a diameter of 0.5 mm being loaded, to obtain [crystalline polyester resin dispersion liquid C1]. The particle diameter of the particles in the obtained [crystalline polyester resin dispersion liquid C1] was 460 nm (solid content concentration: 30%) when measured with LA-920 (manufactured by HORIBA, Ltd.).

<Synthesis of Amorphous Polyester Resin R2>

A reaction tank equipped with a cooling tube, a stirrer, and a nitrogen introducing tube was charged with Bisphenol A ethylene oxide 2 mol adduct (222 parts), Bisphenol A propylene oxide 2 mol adduct (129 parts), isophthalic acid (166 parts), and tetrabutoxytitanate (0.5 parts). Then, under a nitrogen gas stream, the mixture was allowed to react at 230° C. for 8 hours while generated water was removed. Then, the mixture was allowed to react under reduced pressures of from 5 mm Hg to 20 mm Hg, and was cooled to 180° C. (normal pressure) at the time when the acid number reached 2 mg KOH/g. Then, trimellitic anhydride (35 parts) was added thereto, and the mixture was allowed to react for 3 hours, to obtain [amorphous polyester resin R2]. The [amorphous polyester resin R2] had a weight average molecular weight of 8,000 and a glass transition point of 62° C. Moreover, the [amorphous polyester resin R2] had an SP value of 11.2 $(cal/cm^3)^{1/2}$.

<Preparation of Masterbatch 1 of Organically Modified Layered Inorganic Compound>

Water (200 parts), an organically modified layered inorganic compound (CLAYTONE APA, manufactured by BYK JAPAN KK) (500 parts), and the amorphous polyester resin R2 (500 parts) were added and mixed using a Henschel mixer (manufactured by NIPPON COKE & ENGINEERING CO., LTD.). The mixture was kneaded using two rolls at 120° C. for 30 minutes, and was rolled, cooled, and pulverized using a pulverizer, to obtain [masterbatch 1 of organically modified layered inorganic compound].

Example 1

[Production of Glittering Toner 1]

<Preparation of Oil Phase 1>

The following components were charged into a container equipped with a thermometer and a stirring rod, and were dissolved under stirring.

Amorphous polyester resin R2: 271 parts

Ethyl acetate: 93 parts

After the following components were added to the solution obtained above, the components were mixed at 5,000 rpm for an hour using a TK homomixer (manufactured by PRIMIX Corporation) while the internal temperature was kept at 20° C. in an ice bath, to obtain [oil phase 1] (solid content: 60%).

Wax dispersion liquid W1: 240 parts

Crystalline polyester resin dispersion liquid C1: 166 parts

Resin-coated metallic pigment 4: 30 parts

Masterbatch 1 of organically modified layered inorganic compound: 6 parts

Pigment dispersant 2: 59 parts

<Emulsification and Removal of Solvent>

A container equipped with a stirrer and a thermometer was charged with the [aqueous phase] (550 parts), and the mixture was maintained at 20° C. in a water bath. Next, the [oil phase1] (450 parts) that had been maintained at 20° C. was added thereto, and the mixture was mixed at 12,000 rpm for two hours using a TK homomixer (manufactured by Tokushu Kika Kogyo Co., Ltd.) while maintained at 20° C., to obtain an emulsified slurry. The obtained oil droplets were flat when observed with an optical microscope. Moreover, the solvent was removed under reduced pressure at 40° C., to obtain a slurry having an organic solvent volatile content of 0%.

<Washing, Heating, and Drying>

The obtained slurry was cooled to room temperature and was filtered under reduced pressure. Ion-exchanged water (200 parts) was added to the filtered cake, and the mixture was mixed at 800 rpm for five minutes using a three one motor (manufactured by Shinto Scientific Co., Ltd.) to reslurry the cake, followed by filtration. Moreover, a 1% by mass sodium hydroxide aqueous solution (10 parts) and ion-exchanged water (190 parts) were added to the filtered cake, and the mixture was reslurried and filtered in the same manner.

Then, 1% hydrochloric acid (10 parts) and ion-exchanged water (190 parts) were added to the filtered cake, and the mixture was reslurried and filtered in the same manner. Ion-exchanged water (300 parts) was added to the filtered cake, and the mixture was reslurried and filtered. This operation was repeated twice. The filtered cake was dried at 45° C. for 48 hours using a circulating air dryer, and was then sieved using a mesh having an opening of 75 μm, to obtain toner base particles.

<Addition of External Additive>

The toner base particles (100 parts), hydrophobically treated silica HDK-2000 (manufactured by Wacker Chemie) (1 part), and surface-treated titanium oxide JMT-150IB (manufactured by TAYCA CORPORATION) (1 part) were mixed at a peripheral speed of 30 m/s for 30 seconds using a Henschel mixer (manufactured by Mitsui Mining Co., Ltd.), followed by stopping for an hour. This operation was repeated five times. The, the mixture was sieved using a mesh having an opening of 35 μm, to obtain [glittering toner 1].

Example 2

[Production of Glittering Toner 2]

The [glittering toner 2] was obtained in the same manner as in Example 1 except that the [resin-coated metallic pigment 4] used for preparing the oil phase was changed to the [resin-coated metallic pigment 3].

Example 3

[Production of Glittering Toner 3]

The [glittering toner 3] was obtained in the same manner as in Example 1 except that the [resin-coated metallic pigment 4] used for preparing the oil phase was changed to the [resin-coated metallic pigment 2].

Example 4

[Production of Glittering Toner 4]

The [glittering toner 4] was obtained in the same manner as in Example 1 except that the [resin-coated metallic pigment 4] used for preparing the oil phase was changed to the [resin-coated metallic pigment 1].

Example 5

[Production of Glittering Toner 5]

The [glittering toner 5] was obtained in the same manner as in Example 1 except that the [pigment dispersant 2] and the [resin-coated metallic pigment 4] used for preparing the oil phase were changed to the [pigment dispersant 3] and the [resin-coated metallic pigment 1], respectively.

Comparative Example 1

[Production of Glittering Toner 6]

The [glittering toner 6] was obtained in the same manner as in Example 1 except that the [pigment dispersant 2] and the [resin-coated metallic pigment 4] used for preparing the oil phase were changed to the [pigment dispersant 4] and the [resin-coated metallic pigment 3], respectively.

Comparative Example 2

[Production of Glittering Toner 7]

The [glittering toner 7] was obtained in the same manner as in Example 1 except that the [pigment dispersant 2] and the [resin-coated metallic pigment 4] used for preparing the oil phase were changed to the [pigment dispersant 1] and the [resin-coated metallic pigment 2], respectively.

Comparative Example 3

[Production of Glittering Toner 8]

The [glittering toner 8] was obtained in the same manner as in Example 1 except that the [pigment dispersant 2] used for preparing the oil phase was eliminated.

The relative permittivity, the volume resistance, the cross-sectional state, and the surface state of the toners obtained in Examples 1 to 5 and Comparative Examples 1 to 3 were determined as follows.

<Measurement of Relative Permittivity and Volume Resistance>

A toner sample pelletized using an automatic pressure molding machine was measured using a dielectric loss meter TR-10C, an oscillator WBG-9, an equilibrium point detector BDA-9, and electrodes SE-30 (all manufactured by Ando Electric Co., Ltd.). The measurement results are presented in Tables 3-1 and 3-2.

<Observation of Cross-Sectional State>

FIG. 2 illustrates an enlarged photograph of a cross-sectional SEM image of the toner obtained in Example 1.

As illustrated in the region indicated by A in FIG. 2, fine particles of the polyester-styrene acrylic resin are dispersed in the toner matrix.

The observation method using a field emission scanning electron microscope is as follows.

—Observation Method—

1: A sample is embedded in a 30-minute curable epoxy resin, followed by curing.

2: The cured sample is cut with an ultramicrotome ULTRACUT S and a diamond knife, to prepare a cross-section.

3: The obtained cross-sectional sample is dyed in a vapor atmosphere of a 5% aqueous solution of $RuO_4$.

4: The prepared cross section is observed using a field emission scanning electron microscope (cold FE-SEM). The observation conditions are as follows.

SEM observation conditions acceleration voltage: 2.0 kV WD 8 mm×1K, ×2K, ×5X

SEM image: SE (∪)

—Device—

Observation: cold cathode field emission scanning electron microscope (cold FE-SEM) S-4800, manufactured by Hitachi High-Technologies Corporation Each of the obtained toners was evaluated for "transferability" and "image glittering property" as follows.

<Transferability>

A copying machine (imagio MF-6550, manufactured by Ricoh Co., Ltd.) having low temperature fixability was used, and the copying machine was stopped during transfer to transfer paper. Then, the amount of the toner remaining on the photoconductor (hereinafter also referred to as "transfer residual toner") was visually observed and was evaluated based on the following evaluation criteria.

[Evaluation Criteria]

A: The amount of the transfer residual toner was less than 5% relative to the surface area of the photoconductor, and the transferability was very excellent.

B: The amount of the transfer residual toner was 5% or more and less than 10% relative to the surface area of the photoconductor, and the transferability was excellent.

C: The amount of the transfer residual toner was 10% or more and less than 15% relative to the surface area of the photoconductor.

D: The amount of the transfer residual toner was 15% or more relative to the surface area of the photoconductor, and the transferability was poor.

<Image Glittering Property 1>

A developer was loaded into a copying machine, and the image glittering property 1 was evaluated. Specifically, a solid image (3 cm×8 cm) was formed on paper POD gloss paper (manufactured by Oji Paper Co., Ltd.) using a copying machine imagio Neo C600 (manufactured by Ricoh Paper Co., Ltd.) so that the toner adhesion amount was 0.50±0.02 mg/cm$^2$. A speed at which the paper passed through the nip portion of the fixing device was 146 rpm, and the fixing temperature was set to 180° C. The solid image was formed at a 3.0 cm part from the end of the paper in the sheet feeding direction. The flop index value of the solid image was calculated by the following equation, and the image glittering property 1 was evaluated.

$$2.69\times(L^*15^\circ-L^*110^\circ)^{1.11}/(L^*45^\circ)^{0.86}$$

Here, the luminosity (L*) was measured using a multi-angle colorimeter BYK-mac i. Note that, L*15° is the luminosity measured from an angle of 15° with respect to the image, L*45° is the luminosity measured from an angle of 45° with respect to the image, and L*110° is the luminosity measured from an angle of 110° with respect to the image.

In addition, the higher the flop index value, the larger the color change depending on the viewing angle, thereby increasing the image glittering property.

[Evaluation Criteria]

A: The flop index value was 7.5 or more.

B: The flop index value was 6.5 or more and less than 7.5.

C: The flop index value was 5.5 or more and less than 6.5.

D: The flop index value was less than 5.5.

<Image Glittering Property 2>

The image glittering property 2 was evaluated in the same manner as in the <Image glittering property 1> except that the speed at which the paper passed through the nip portion of the fixing device was 73 rpm and the evaluation criteria were changed to the following.

[Evaluation Criteria]

A: The flop index value was 7.5 or more.

B: The flop index value was 6.5 or more and less than 7.5.

C: The flop index value was 5.5 or more and less than 6.5.

D: The flop index value was less than 5.5.

Tables 3-1 and 3-2 list the compositions and the evaluation results of the toners obtained in Examples 1 to 5 and Comparative Examples 1 to 3.

TABLE 3-1

| Example/ Comparative Example No. | Glittering toner No. | Metallic pigment Kind | SPpig | Pigment dispersant Kind | SP1 | Polyester resin SP2 | SP2-SP1 |
|---|---|---|---|---|---|---|---|
| Example 1 | Glittering toner 1 | Res in-coated metallic pigment 4 | 11.9 | Pigment dispersant 2 | 10.8 | 11.2 | 0.4 |
| Example 2 | Glittering toner 2 | Resin-coated metallic pigment 3 | 12.1 | Pigment dispersant 2 | 10.8 | 11.2 | 0.4 |
| Example 3 | Glittering toner 3 | Resin-coated metallic pigment 2 | 12.9 | Pigment dispersant 2 | 10.8 | 11.2 | 0.4 |
| Example 4 | Glittering toner 4 | Resin-coated metallic pigment 1 | 13.1 | Pigment dispersant 2 | 10.8 | 11.2 | 0.4 |
| Example 5 | Glittering toner 5 | Resin-coated metallic pigment 1 | 13.1 | Pigment dispersant 3 | 10.1 | 11.2 | 1.1 |
| Comparative Example 1 | Glittering toner 6 | Resin-coated metallic pigment 3 | 12.1 | Pigment dispersant 4 | 9.9 | 11.2 | 1.3 |
| Comparative Example 2 | Glittering toner 7 | Resin-coated metallic pigment 2 | 12.9 | Pigment dispersant 1 | 11.00 | 11.2 | 0.2 |
| Comparative Example 3 | Glittering toner 8 | Resin-coated metallic pigment 4 | 11.9 | — | | 11.2 | 11.2 |

TABLE 3-2

| Example/ Comparative Example No. | Transfer-ability | Glittering property 1 | Glittering property 2 | Relative permit-tivity | Volume resistance log [Ωcm] |
|---|---|---|---|---|---|
| Example 1 | A | A | A | 5.0 | 10.6 |
| Example 2 | A | B | A | 5.4 | 10.6 |
| Example 3 | B | B | A | 5.8 | 10.4 |
| Example 4 | B | B | B | 5.6 | 10.3 |
| Example 5 | B | B | B | 5.7 | 10.3 |
| Comparative Example 1 | D | C | C | 6.6 | 10.3 |
| Comparative Example 2 | D | D | C | 7.3 | 10.4 |
| Comparative Example 3 | D | D | D | 7.3 | 10.2 |

In Example 1, since the metallic pigment is not exposed and the relative permittivity is small, the transferability is good.

Also, in Example 2, the metallic pigment is not exposed, but a difference in the solubility parameter between the polyester resin and the metallic pigment is larger than that in Example 1. Therefore, the affinity with various materials is decreased, and there is no influence such that the electric resistance is deteriorated, but the glittering property 1 is inferior to that in Example 1.

In Example 3, since a difference in the solubility parameter between the polyester resin and the metallic pigment is large, both the transferability and the glittering property 1 are inferior to those in Example 1 due to the influence of the toner edge formed by the metallic pigment.

In Example 4, since a difference in the solubility parameter between the polyester resin and the metallic pigment is larger than that in Example 3, the metallic pigment is unevenly distributed in the vicinity of the surface of the toner, and the pigment is exposed. As a result, the glittering property 2 is inferior to that in Example 3.

In Example 5, since a difference in the solubility parameter between the polyester resin and the metallic pigment is larger than that in Example 3, the metallic pigment is unevenly distributed in the vicinity of the surface of the toner, and the pigment is exposed. As a result, the glittering property 2 is inferior to that in Example 3. In Example 5, since a difference in the solubility between the pigment dispersant and the polyester resin was larger than that in Example 4, the main effect of the pigment dispersant was expected, but a significant influence on the properties was not observed.

In Comparative Example 1, since the solubility parameter of the pigment dispersant is small, the affinity with the polyester resin is small, and the materials in the toner particles tend to be separated from each other. Therefore, the relative permittivity is high, the pigment dispersion is poor, and both the transferability and the glittering properties are inferior to those in Example 5. In addition, the transferability is ranked as D.

In Comparative Example 2, since a difference in the solubility between the pigment dispersant and the polyester resin is small, the pigment dispersant does not exhibit the main effect, and the glittering property 2 is inferior to that in Comparative Example 1. In addition, both the transferability and the glittering property 1 are ranked as D.

In Comparative Example 3, since no pigment dispersant is present, the variation in the presence of the metallic pigment in the toner particles is large, and the glittering property 2 is inferior to that in Comparative Example 2. All of the transferability, the glittering property 1, and the glittering property 2 are ranked as D.

Aspects of the present disclosure are as follows, for example.

<1> A glittering toner including:

a flat metallic pigment having a surface coated with a resin;

a polyester-styrene acrylic composite resin; and a polyester resin, wherein when a solubility parameter of the polyester-styrene acrylic composite resin is represented by SP1

$(cal/cm^3)^{1/2}$ and a solubility parameter of the polyester resin is represented by SP2 $(cal/cm^3)^{1/2}$, the SP1 and the SP2 satisfy a relational expression (1) below and the SP1 satisfies a relational expression (2) below, $$SP2-SP1>0.3 \quad (1)$$

$$10<SP1 \quad (2).$$

<2> The glittering toner according to <1>, wherein when a solubility parameter of the flat metallic pigment having the surface coated with the resin is represented by SPpig $(cal/cm^3)^{1/2}$, the SP2 and the SPpig satisfy a relational expression (3) below, $$SP2<SPpig<13 \quad (3).$$

<3> The glittering toner according to <2>, wherein the SP2 and the SPpig satisfy a relational expression (4) below, $$SP2<SPpig<12 \quad (4).$$

<4> A toner-storing unit:

the glittering toner according to any one of <1> to <3>; and a unit that stores the glittering toner.

<5> A developer including:

the glittering toner according to any one of <1> to <3>; and a carrier.

<6> A developer-storing unit including:

the developer according to <5>; and a unit that stores the developer.

<7> An image forming apparatus including:

an electrostatic latent image bearer;

an electrostatic latent image formation unit configured to form an electrostatic latent image on the electrostatic latent image bearer;

a developing unit that includes the glittering toner according to any one of <1> to <3> and is configured to develop, with the glittering toner, the electrostatic latent image formed on the electrostatic latent image bearer to form a toner image;

a transfer unit configured to transfer the toner image formed on the electrostatic latent image bearer onto a surface of a recording medium; and a fixing unit configured to fix the toner image transferred onto the surface of the recording medium.

<8> An image forming method including:

forming an electrostatic latent image on an electrostatic latent image bearer;

developing, with the glittering toner according to any one of <1> to <3>, the electrostatic latent image formed on the electrostatic latent image bearer, to form a toner image;

transferring the toner image formed on the electrostatic latent image bearer onto a surface of a recording medium; and fixing the toner image transferred onto the surface of the recording medium.

The glittering toner according to any one of <1> to <3>, the toner-storing unit according to <4>, the developer according to <5>, the developer-storing unit according to <6>, the image forming apparatus according to <7>, and the image forming method according to <8> can solve the conventionally existing problems and can achieve the object of the present disclosure.

Further, the present invention is not limited to these embodiments, but various variations and modifications may be made without departing from the scope of the present invention.

What is claimed is:

1. A glittering toner comprising:

a flat metallic pigment having a surface coated with a resin, an aspect ratio of the flat metallic pigment being 20 or more and 200 or less;

a polyester-styrene acrylic composite resin; and a polyester resin, wherein when a solubility parameter of the polyester-styrene acrylic composite resin is represented by SP1 $(cal/cm^3)^{1/2}$ and a solubility parameter of the polyester resin is represented by SP2 $(cal/cm^3)^{1/2}$, the SPI and the SP2 satisfy a relational expression (1) below and the SP1 satisfies a relational expression (2) below, $$SP2-SP1>0.3 \quad (1)$$

$$10<SP1 \quad (2),$$

wherein the flat metallic pigment includes aluminum, brass, bronze, nickel, stainless steel, zinc, copper, silver, gold, platinum, or metal-deposited flaky glass powder, wherein the resin coating the surface of the flat metallic pigment is a polymer of acrylic acid, methacrylic acid, methyl methacrylate, butyl acrylate, 2-ethylhexyl acrylate, lauryl acrylate, stearyl acrylate, cyclohexyl acrylate, 2-hydroxyethyl acrylate, 2-hydroxybutyl acrylate, 2-methoxyethyl acrylate, 2-diethylaminoethyl acrylate, butyl methacrylate, octyl methacrylate, 1,4-butanediol diacrylate, 1,6-hexanediol diacrylate, 1,9-nonanediol diacrylate, neopentyl glycol diacrylate, tripropylene glycol diacrylate tetraethylene glycol diacrylate, trimethylolpropane triacrylate, trimethylolpropane trimethacrylate, tetramethylolmethane tetraacrylate, pentaerythritol triacrylate trisacryloxyethyl phosphate, ditrimethylolpropane tetraacrylate, styrene, α-methylstyrene, vinyltoluene, divinylbenzene, acrylonitrile, methacrylonitrile, vinyl acetate, vinyl propionate, maleic acid, crotonic acid, itaconic acid, polybutadiene, linseed oil, soybean oil, epoxidized soybean oil, epoxidized polybutadiene, cyclohexene vinylmonoxide, divinylbenzene monoxide, mono (2-acryloyloxyethyl) acid phosphate, mono (2-methacryloyloxyethyl) acid phosphate, 2-acryloyloxyethyl acid phosphate, 2-methacryloyloxyethyl acid phosphate, (2-hydroxyethyl) methacrylate acid phosphate, 2-methacryloyloxyethyl acid phosphate, 2-acryloyloxyethyl acid phosphate, diphenyl methacryloyloxyethyl acid phosphate, diphenyl acryloyloxyethyl acid phosphate, dibutyl methacryloyloxyethyl acid phosphate, dibutyl acryloyloxyethyl acid phosphate, dioctyl methacryloyloxyethyl acid phosphate, dioctyl acryloyloxyethyl acid phosphate, 2-methacryloyloxypropyl acid phosphate, bis(2-chloroethyl) vinyl phosphonate, di-2-methacryloyloxyethyl acid phosphate, tri-2-methacryloyloxyethyl acid phosphate, di-2-acryloyloxyethyl acid phosphate, tri-2-acryloyloxyethyl acid phosphate, diallyl-dibutylphosphonosuccinate, an acrylic-modified polyester having a degree of polymerization of 2 to 20, an acrylic-modified polyether having a degree of polymerization of 2 to 20, an acrylic-modified urethane having a degree of polymerization of 2 to 20, an acrylic-modified epoxy having a degree of polymerization of 2 to 20, or an acrylic-modified spiran having a degree of polymerization of 2 to 20, wherein the polyester-styrene acrylic composite resin is an amorphous resin including a styrene-acrylic portion and a polyester portion, and wherein the polyester resin includes a component A, a component B, and a component C, component A including a constituent unit of a polyhydric alcohol and a constituent unit of a polycarboxylic acid, component B being a modified polyester containing a bond other than an ester bond, and component C being a linear polyester.

2. The glittering toner according to claim 1, wherein when a solubility parameter of the flat metallic pigment having the surface coated with the resin is represented by SPpig $(cal/cm^3)^{1/2}$, the SP2 and the SPpig satisfy a relational expression (3) below, $$SP2<SPpig<13 \quad (3).$$

3. The glittering toner according to claim 2, wherein the SP2 and the SPpig satisfy a relational expression (4) below, $$SP2<SPpig<12 \quad (4).$$

4. A toner-storing unit comprising:

the glittering toner according to claim 1; and a unit that stores the glittering toner.

5. A developer comprising:

the glittering toner according to claim 1; and a carrier.

6. A developer-storing unit comprising:

the developer according to claim 5; and a unit that stores the developer.

7. An image forming apparatus comprising:

an electrostatic latent image bearer;

an electrostatic latent image formation unit configured to form an electrostatic latent image on the electrostatic latent image bearer;

a developing unit that includes the glittering toner according to claim 1 and is configured to develop, with the glittering toner, the electrostatic latent image formed on the electrostatic latent image bearer to form a toner image;

a transfer unit configured to transfer the toner image formed on the electrostatic latent image bearer onto a surface of a recording medium; and a fixing unit configured to fix the toner image transferred onto the surface of the recording medium.

8. An image forming method comprising:

forming an electrostatic latent image on an electrostatic latent image bearer;

developing, with the glittering toner according to claim 1, the electrostatic latent image formed on the electrostatic latent image bearer, to form a toner image;

transferring the toner image formed on the electrostatic latent image bearer onto a surface of a recording medium; and fixing the toner image transferred onto the surface of the recording medium.

* * * * *